United States Patent
Chang et al.

(10) Patent No.: US 11,975,499 B2
(45) Date of Patent: May 7, 2024

(54) METHOD FOR MAKING PHOTOCHROMIC CONTACT LENSES

(71) Applicant: Alcon Inc., Fribourg (CH)

(72) Inventors: Yuan Chang, Atlanta, GA (US); Junhao Ge, Redwood City, CA (US); Steve Yun Zhang, Sugar Hill, GA (US)

(73) Assignee: Alcon Inc., Fribourg (CH)

( * ) Notice: Subject to any disclaimer, the term of this patent is extended or adjusted under 35 U.S.C. 154(b) by 280 days.

(21) Appl. No.: 17/518,432

(22) Filed: Nov. 3, 2021

(65) Prior Publication Data

US 2022/0134692 A1 May 5, 2022

Related U.S. Application Data

(60) Provisional application No. 63/109,577, filed on Nov. 4, 2020.

(51) Int. Cl.
*C08F 2/48* (2006.01)
*B29D 11/00* (2006.01)
*G02B 1/04* (2006.01)

(52) U.S. Cl.
CPC .......... *B29D 11/00048* (2013.01); *C08F 2/48* (2013.01); *G02B 1/043* (2013.01)

(58) Field of Classification Search
None
See application file for complete search history.

(56) References Cited

U.S. PATENT DOCUMENTS

| | | |
|---|---|---|
| 3,100,778 A | 8/1963 | Berman |
| 3,562,172 A | 2/1971 | Ono et al. |
| 3,567,605 A | 3/1971 | Becker |
| 3,578,602 A | 5/1971 | Ono et al. |
| 3,671,543 A | 6/1972 | Koga et al. |
| 4,136,250 A | 1/1979 | Mueller et al. |
| 4,153,641 A | 5/1979 | Deichert et al. |
| 4,182,822 A | 1/1980 | Chang |
| 4,189,546 A | 2/1980 | Deichert et al. |
| 4,215,010 A | 7/1980 | Hovey et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,312,575 A | 1/1982 | Peyman et al. |
| 4,327,203 A | 4/1982 | Deichert et al. |
| 4,341,889 A | 7/1982 | Deichert et al. |
| 4,342,668 A | 8/1982 | Hovey et al. |
| 4,343,927 A | 8/1982 | Chang |
| 4,355,147 A | 10/1982 | Deichert et al. |
| 4,440,672 A | 4/1984 | Chu |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,632,844 A | 12/1986 | Yanagihara et al. |
| 4,634,767 A | 1/1987 | Hoelscher et al. |
| 4,636,561 A | 1/1987 | Hosoda |
| 4,637,698 A | 1/1987 | Kwak et al. |
| 4,661,575 A | 4/1987 | Tom |
| 4,681,412 A | 7/1987 | Lemelson |
| 4,684,538 A | 8/1987 | Klemarczyk |
| 4,699,473 A | 10/1987 | Chu |
| 4,703,097 A | 10/1987 | Wingler et al. |
| 4,719,296 A | 1/1988 | Irie et al. |
| 4,720,547 A | 1/1988 | Kwak et al. |
| 4,772,700 A | 9/1988 | Kawauchi et al. |
| 4,784,474 A | 11/1988 | Yamamoto et al. |
| 4,785,097 A | 11/1988 | Kwak |
| 4,816,584 A | 3/1989 | Kwak et al. |
| 4,818,096 A | 4/1989 | Heller et al. |
| 4,826,977 A | 5/1989 | Heller et al. |
| 4,831,142 A | 5/1989 | Kwak |
| 4,833,218 A | 5/1989 | Lee |
| 4,837,289 A | 6/1989 | Mueller et al. |
| 4,880,667 A | 11/1989 | Welch |

(Continued)

FOREIGN PATENT DOCUMENTS

EP 1208392 A1 5/2002

OTHER PUBLICATIONS

Becer et al. "Thioester functional polymers", Polymer Chemistry, Sep. 2018, vol. 9, No. 36, pp. 4507-4516.
Chen et al., "Light-Controlled Radical Polymerization: Mechanisms, Methods, and Applications", Chemical Reviews, 2016, 116, pp. 10167-10211.
Espeel, P. et. al, "One-Pot Multi-Step Reactions Based on Thiolactone Chemistry: A Powerful Synthetic Tool in Polymer Science", European Polymer Journal, 62, 2015, pp. 247-272.
Frank et al. "Synthesis of thiolactone building blocks as potential precursors for sustainable functional materials", Tetrahedron, 2016, 72, pp. 6616-6625.

(Continued)

*Primary Examiner* — Jacob T Minskey
*Assistant Examiner* — Adrien J Bernard
(74) *Attorney, Agent, or Firm* — Jian Zhou

(57) ABSTRACT

Described herein is a method for producing photochromic contact lenses, in particular, photochromic silicone hydrogel contact lenses. The method comprises a step of cast molding of a lens-forming composition including a vinylic monomer having a primary amino or thiolactone group to form an unprocessed contact lens having the polymer matrix of which have pendant primary amino or thiolactone groups, a step of one-pot multistep reactions based on thiolactone chemistry (aminolysis and thiol-induced graft polymerization of a photochromic vinylic monomer to the polymer matrix) which are carried out only in its central region which is circular and concentric with the central axis of the unprocessed contact lens. The obtained photochromic contact lens has a central pupillary region that only can undergo a reversible color change upon exposure to UV/HEVL-radiation.

21 Claims, No Drawings

(56) References Cited

U.S. PATENT DOCUMENTS

| | | |
|---|---|---|
| 4,929,693 A | 5/1990 | Akashi et al. |
| 4,931,219 A | 6/1990 | Kwiatkowski et al. |
| 4,931,221 A | 6/1990 | Heller |
| 4,954,586 A | 9/1990 | Toyoshima et al. |
| 4,954,587 A | 9/1990 | Mueller |
| 4,959,471 A | 9/1990 | Melzig |
| 4,980,089 A | 12/1990 | Heller |
| 4,986,934 A | 1/1991 | Kwiatkowski et al. |
| 5,010,141 A | 4/1991 | Mueller |
| 5,034,461 A | 7/1991 | Lai et al. |
| 5,039,761 A | 8/1991 | Ono et al. |
| 5,055,576 A | 10/1991 | Castaldi et al. |
| 5,066,818 A | 11/1991 | Gemert et al. |
| 5,070,170 A | 12/1991 | Robertson et al. |
| 5,070,215 A | 12/1991 | Bambury et al. |
| 5,079,319 A | 1/1992 | Mueller |
| 5,110,922 A | 5/1992 | Castaldi et al. |
| 5,114,621 A | 5/1992 | Guglielmetti et al. |
| 5,139,707 A | 8/1992 | Guglielmetti et al. |
| 5,166,345 A | 11/1992 | Akashi et al. |
| 5,171,636 A | 12/1992 | Castaldi et al. |
| 5,180,524 A | 1/1993 | Casilli et al. |
| 5,186,867 A | 2/1993 | Castaldi et al. |
| 5,200,116 A | 4/1993 | Heller |
| 5,238,931 A | 8/1993 | Yoshikawa et al. |
| 5,238,981 A | 8/1993 | Knowles |
| 5,240,972 A | 8/1993 | Kumar et al. |
| 5,244,602 A | 9/1993 | Van Gemert |
| 5,274,132 A | 12/1993 | VanGemert |
| 5,340,857 A | 8/1994 | Van Gemert |
| 5,346,946 A | 9/1994 | Yokoyama et al. |
| 5,358,995 A | 10/1994 | Lai et al. |
| 5,369,158 A | 11/1994 | Knowles |
| 5,384,077 A | 1/1995 | Knowles |
| 5,387,632 A | 2/1995 | Lai et al. |
| 5,395,567 A | 3/1995 | Van Gemert et al. |
| 5,399,687 A | 3/1995 | Melzig |
| 5,405,958 A | 4/1995 | VanGemert |
| 5,411,679 A | 5/1995 | Kumar |
| 5,416,132 A | 5/1995 | Yokoyama et al. |
| 5,429,774 A | 7/1995 | Kumar |
| 5,449,703 A | 9/1995 | Mitra et al. |
| 5,449,729 A | 9/1995 | Lai |
| 5,451,344 A | 9/1995 | Knowles et al. |
| 5,451,617 A | 9/1995 | Lai et al. |
| 5,458,814 A | 10/1995 | Kumar et al. |
| 5,458,815 A | 10/1995 | Knowles |
| 5,464,567 A | 11/1995 | Knowles et al. |
| 5,466,398 A | 11/1995 | Van Gemert et al. |
| 5,486,579 A | 1/1996 | Lai et al. |
| 5,514,817 A | 5/1996 | Knowles |
| 5,520,853 A | 5/1996 | Rickwood et al. |
| 5,552,090 A | 9/1996 | Van Gemert et al. |
| 5,552,091 A | 9/1996 | Kumar |
| 5,565,147 A | 10/1996 | Knowles et al. |
| 5,573,712 A | 11/1996 | Kumar et al. |
| 5,578,252 A | 11/1996 | Van Gemert et al. |
| 5,583,163 A | 12/1996 | Müller |
| 5,585,042 A | 12/1996 | Knowles |
| 5,623,005 A | 4/1997 | Rickwood et al. |
| 5,637,262 A | 6/1997 | Van Gemert et al. |
| 5,637,709 A | 6/1997 | Melzig |
| 5,645,767 A | 7/1997 | Van Gemert |
| 5,650,098 A | 7/1997 | Kumar et al. |
| 5,651,923 A | 7/1997 | Kumar et al. |
| 5,656,206 A | 8/1997 | Knowles et al. |
| 5,658,500 A | 8/1997 | Kumar et al. |
| 5,658,501 A | 8/1997 | Kumar et al. |
| 5,658,986 A | 8/1997 | Clouet |
| 5,665,840 A | 9/1997 | Poehlmann et al. |
| 5,674,432 A | 10/1997 | Knowles et al. |
| 5,698,141 A | 12/1997 | Kumar |
| 5,712,356 A | 1/1998 | Bothe et al. |
| 5,723,072 A | 3/1998 | Kumar |
| 5,728,758 A | 3/1998 | Smith |
| 5,730,908 A | 3/1998 | Nodari et al. |
| 5,744,070 A | 4/1998 | Kumar |
| 5,759,450 A | 6/1998 | Hughes et al. |
| 5,760,100 A | 6/1998 | Nicolson et al. |
| 5,783,116 A | 7/1998 | Lin |
| 5,801,243 A | 9/1998 | Melzig et al. |
| 5,808,063 A | 9/1998 | Kumar |
| 5,811,034 A | 9/1998 | Lin |
| 5,831,090 A | 11/1998 | Paltchkov et al. |
| 5,833,885 A | 11/1998 | Rickwood et al. |
| 5,843,346 A | 12/1998 | Morrill |
| 5,849,841 A | 12/1998 | Muehlebach et al. |
| 5,866,047 A | 2/1999 | Nagino et al. |
| 5,869,658 A | 2/1999 | Lin et al. |
| 5,879,592 A | 3/1999 | Kumar |
| 5,891,368 A | 4/1999 | Kumar |
| 5,894,002 A | 4/1999 | Boneberger et al. |
| 5,955,520 A | 9/1999 | Heller et al. |
| 5,961,892 A | 10/1999 | Gemert et al. |
| 5,962,548 A | 10/1999 | Vanderlaan et al. |
| 5,981,634 A | 11/1999 | Smith et al. |
| 5,981,675 A | 11/1999 | Valint, Jr. et al. |
| 5,998,520 A | 12/1999 | Krishnan et al. |
| 6,004,486 A | 12/1999 | Chan |
| 6,017,121 A | 1/2000 | Chateau et al. |
| 6,018,059 A | 1/2000 | Chan |
| 6,019,914 A | 2/2000 | Lokshin et al. |
| 6,022,495 A | 2/2000 | Kumar |
| 6,022,497 A | 2/2000 | Kumar |
| 6,030,555 A | 2/2000 | Chan |
| 6,034,193 A | 3/2000 | Henry et al. |
| 6,039,913 A | 3/2000 | Hirt et al. |
| 6,065,836 A | 5/2000 | Krishnan et al. |
| 6,106,744 A | 8/2000 | Van Gemert et al. |
| 6,107,395 A | 8/2000 | Rosthauser et al. |
| 6,113,814 A | 9/2000 | Gemert et al. |
| 6,146,554 A | 11/2000 | Melzig et al. |
| 6,149,841 A | 11/2000 | Kumar |
| 6,153,126 A | 11/2000 | Kumar |
| 6,165,408 A | 12/2000 | Steinmann |
| 6,166,236 A | 12/2000 | Bambury et al. |
| 6,174,464 B1 | 1/2001 | Garrity |
| 6,221,284 B1 | 4/2001 | Florent et al. |
| 6,224,945 B1 | 5/2001 | Calderara |
| 6,248,264 B1 | 6/2001 | Clarke et al. |
| 6,255,422 B1 | 7/2001 | Bertin et al. |
| 6,296,785 B1 | 10/2001 | Nelson et al. |
| 6,303,687 B1 | 10/2001 | Mueller |
| 6,315,928 B1 | 11/2001 | Mann et al. |
| 6,342,459 B1 | 1/2002 | Melzig et al. |
| 6,348,604 B1 | 2/2002 | Nelson et al. |
| 6,353,102 B1 | 3/2002 | Kumar |
| 6,367,929 B1 | 4/2002 | Maiden et al. |
| 6,414,057 B1 | 7/2002 | Crisci et al. |
| 6,451,871 B1 | 9/2002 | Winterton et al. |
| 6,472,489 B1 | 10/2002 | Stockinger |
| 6,478,988 B1 | 11/2002 | Hughes et al. |
| 6,479,587 B1 | 11/2002 | Stockinger et al. |
| 6,492,478 B1 | 12/2002 | Steinmann |
| 6,627,124 B1 | 9/2003 | Herbrechtsmeier et al. |
| 6,630,597 B1 | 10/2003 | Lin et al. |
| 6,667,376 B2 | 12/2003 | Charmot et al. |
| 6,719,929 B2 | 4/2004 | Winterton et al. |
| 6,762,264 B2 | 7/2004 | Kunzler et al. |
| 6,793,973 B2 | 9/2004 | Winterton et al. |
| 6,800,225 B1 | 10/2004 | Hagmann et al. |
| 6,811,805 B2 | 11/2004 | Gilliard et al. |
| 6,822,016 B2 | 11/2004 | McCabe et al. |
| 6,833,276 B2 | 12/2004 | Klaerner et al. |
| 6,867,245 B2 | 3/2005 | Iwata et al. |
| 6,896,926 B2 | 5/2005 | Qiu et al. |
| 6,995,192 B2 | 2/2006 | Phelan |
| 7,214,809 B2 | 5/2007 | Zanini et al. |
| 7,261,844 B2 | 8/2007 | Tanikawa et al. |
| 7,351,781 B2 | 4/2008 | White et al. |
| 7,368,072 B2 | 5/2008 | Gemert et al. |
| 7,384,590 B2 | 6/2008 | Kelly et al. |
| 7,387,759 B2 | 6/2008 | Kelly et al. |
| 7,423,074 B2 | 9/2008 | Lai et al. |

(56) References Cited

U.S. PATENT DOCUMENTS

| | | |
|---|---|---|
| 7,556,750 B2 | 7/2009 | Xiao et al. |
| 7,560,056 B2 | 7/2009 | Van Gemert et al. |
| 7,584,630 B2 | 9/2009 | Van Gemert et al. |
| 7,605,190 B2 | 10/2009 | Moszner et al. |
| 7,641,337 B2 | 1/2010 | Altmann |
| 7,858,000 B2 | 12/2010 | Winterton |
| 7,943,680 B2 | 5/2011 | Bowman et al. |
| 7,977,430 B2 | 7/2011 | Devlin et al. |
| 7,999,989 B2 | 8/2011 | Asai et al. |
| 8,147,897 B2 | 4/2012 | Ferreiro et al. |
| 8,158,037 B2 | 4/2012 | Chopra et al. |
| 8,163,206 B2 | 4/2012 | Chang et al. |
| 8,318,144 B2 | 11/2012 | Ketelson et al. |
| 8,409,599 B2 | 4/2013 | Wu et al. |
| 8,415,405 B2 | 4/2013 | Maggio et al. |
| 8,475,529 B2 | 7/2013 | Clarke |
| 8,480,227 B2 | 7/2013 | Qiu et al. |
| 8,529,057 B2 | 9/2013 | Qiu et al. |
| 8,557,334 B2 | 10/2013 | Samuel et al. |
| 8,614,261 B2 | 12/2013 | Iwata et al. |
| 8,658,748 B2 | 2/2014 | Liu |
| 8,697,770 B2 | 4/2014 | Duis et al. |
| 8,698,117 B2 | 4/2014 | He et al. |
| 8,741,188 B2 | 6/2014 | Chopra et al. |
| 8,835,525 B2 | 9/2014 | Kuyu et al. |
| 8,877,830 B2 | 11/2014 | Bowman et al. |
| 8,993,651 B2 | 3/2015 | Chang et al. |
| 9,028,728 B2 | 5/2015 | Bancroft et al. |
| 9,029,532 B2 | 5/2015 | Dabideen et al. |
| 9,052,438 B2 | 6/2015 | Xiao et al. |
| 9,097,840 B2 | 8/2015 | Chang et al. |
| 9,097,916 B2 | 8/2015 | Chopra et al. |
| 9,103,965 B2 | 8/2015 | Chang |
| 9,138,383 B1 | 9/2015 | Stansbury |
| 9,187,601 B2 | 11/2015 | Huang et al. |
| 9,217,813 B2 | 12/2015 | Liu et al. |
| 9,238,003 B2 | 1/2016 | Byrne et al. |
| 9,315,669 B2 | 4/2016 | Holland et al. |
| 9,377,569 B2 | 6/2016 | Ishak et al. |
| 9,465,234 B2 | 10/2016 | Chopra et al. |
| 9,475,827 B2 | 10/2016 | Chang et al. |
| 9,487,499 B2 | 11/2016 | He et al. |
| 9,505,184 B2 | 11/2016 | Kolluru et al. |
| 9,758,597 B2 | 9/2017 | Bowman et al. |
| 9,904,074 B2 | 2/2018 | Duis et al. |
| 10,081,697 B2 | 9/2018 | Huang et al. |
| 10,197,707 B2 | 2/2019 | Xiao et al. |
| 10,301,451 B2 | 5/2019 | Jing et al. |
| 10,310,293 B2 | 6/2019 | Duis et al. |
| 10,324,311 B2 | 6/2019 | Holland et al. |
| 10,465,047 B2 | 11/2019 | Jing et al. |
| 10,501,446 B2 | 12/2019 | He et al. |
| 10,502,998 B2 | 12/2019 | Xu et al. |
| 10,532,997 B2 | 1/2020 | He et al. |
| 2005/0258408 A1 | 11/2005 | Molock et al. |
| 2012/0023869 A1 | 2/2012 | Samuel |
| 2015/0137397 A1 | 5/2015 | Katou |
| 2018/0081197 A1 | 3/2018 | Qiu et al. |
| 2018/0105620 A1 | 4/2018 | Chang et al. |

OTHER PUBLICATIONS

Otsu Takayuki, "Iniferter Concept and Living Radical Polymerization", Journal of Polymer Science: Part A: Polymer Chemistry, 2000, vol. 38, pp. 2121-2136.

METHOD FOR MAKING PHOTOCHROMIC CONTACT LENSES

This application claims the benefit under 35 USC § 119 (e) of U.S. provisional application No. 63/109,577 filed 4 Nov. 2020, incorporated by reference in its entirety.

This invention is related to a method for producing photochromic contact lenses, in particular, preferably photochromic silicone hydrogel contact lenses, only the central pupillary regions of which can undergo a reversible color change upon exposure to UV-radiation or high-energy-violet light (HEVL) radiation (with wavelengths from 380 nm to 440 nm). This invention also provides photochromic contact lenses or more preferably photochromic silicone hydrogel contact lenses made according to a method of the invention.

BACKGROUND

Conventionally, UV-absorbing compounds have been incorporated into contact lenses to make UV-absorbing contact lenses to protect eyes from UV-radiations. Recently, there have been proposed various photochromic contact lenses for protecting eyes from UV-radiations (see, e.g., U.S. Pat. Nos. 4,681,412, 6,017,121, 6,174,464, 6,224,945, 7,261,844, 7,368,072, 7,556,750, 7,560,056, 7,584,630, 7,641,337, 7,999,989, 8,158,037, 8,697,770, 8,741,188, 9,052,438, 9,097,916, 9,377,569, 9,465,234, 9,904,074, 10,197,707). Those proposed photochromic contact lenses contains photochromic compounds which are capable of undergoing a reversible color change, e.g., from "clear" to blue or other color, upon exposure to UV/HEVL radiation.

Typically, photochromic contact lenses can be obtained by adding a photochromic compound in a polymerizable composition (i.e., lens formulation) for forming the contact lenses and then by curing the polymerizable composition in contact lens molds according to a cast-molding lens manufacturing process. A conventional cast-molding lens manufacturing process comprises: one single-step curing (polymerizing) of one single polymerizable composition (lens formulation) within disposable plastic molds typically consisting of two single-use mold halves; opening molds; optionally but preferably delensing (i.e., removing cast-molded lenses from the molds); and being subjected to various post-molding processes including extraction, hydration, packaging, and sterilization, etc.

However, photochromic contact lenses obtained according to such a conventional cast-molding process have photochromic compound incorporated uniformly within the polymer matrix of the photochromic contact lenses and are, from edge-to-edge, capable of undergoing a reversible color change upon exposure to UV/HEVL-radiation. Such photochromic contact lenses are not desirable for cosmetic reasons. It would be desirable to produce a photochromic contact lens that changes color only in the central pupil region.

U.S. Pat. Nos. 7,368,072, 7,560,056, 8,697,770 and 9,904,074 disclose methods for making photochromic contact lenses only the central pupillary regions of which can undergo a reversible color change upon exposure to UV/HEVL-radiation. Those methods comprise steps of: dosing a photochromic lens-forming composition onto the central region of the molding surface of a mold half and followed by adding a clear lens-forming composition on the top of the photochromic lens-forming composition, wherein the photochromic lens-forming composition has a viscosity much higher than the clear lens-forming composition; mating with the other mold half to form a cavity with the photochromic and clear lens-forming compositions therewithin; and curing the photochromic and clear lens-forming compositions within the cavity of the mold to form the photochromic contact lens. However, handling and dosing of a high viscous photochromic lens-forming composition could be challenging in a production environment.

Therefore, there is still a need for a method for making photochromic contact lenses only the central pupillary regions of which can undergo a reversible color change upon exposure to UV/HEVL-radiation.

SUMMARY

The invention, in one aspect, provides a method for producing photochromic contact lenses, comprising the steps of: (1) obtaining a first polymerizable fluid composition, wherein the first polymerizable fluid composition comprises (i) at least one polymerizable material, (ii) at least one first free-radical initiator, and (iii) at least one first thiolactone-containing vinylic monomer having a thiolactone group or at least one first amino-containing vinylic monomer having a primary amino group; (2) introducing the first polymerizable fluid composition into a lens mold, wherein the lens mold comprises a male mold half having a first molding surface and a female mold half having a second molding surface, wherein the male and female mold halves are configured to receive each other such that a mold cavity is formed between the first and second molding surfaces and the first polymerizable fluid composition is enclosed in the mold cavity when the mold is closed; (3) curing thermally or actinically the first polymerizable fluid composition in the mold cavity of the lens mold to form an unprocessed contact lens having a crosslinked polymer network with pendant thiolactone groups or pendant primary amino groups; (4) separating the lens mold into the male and female mold halves, with the unprocessed contact lens adhered onto a lens-adhered mold half which is one of the male and female mold halves; (5) applying a second polymerizable fluid composition onto a central circular region on the surface of the unprocessed contact lens adhered on the lens-adhered mold half, wherein the second polymerizable fluid composition comprises (i) at least one photochromic vinylic monomer, (ii) at least one amino-containing compound having a primary amino group or at least one thiolactone-containing compound having a thiolactone group, and (iii) at least one second free-radical initiator, wherein if the first polymerizable fluid composition comprses said at least one first thiolactone-containing vinylic monomer, the second polymerizable fluid composition comprises said at least one amino-containing compound, wherein if the first polymerizable fluid composition comprses said at least one first amino-containing vinylic monomer, the second polymerizable fluid composition comprises said at least one thiolactone-containing compound; (6) allowing the second polymerizable fluid composition penetrating and diffusing into the crosslinked polymer network located in a central circular zone, thereby forming pendant thiol groups each of which is formed between one of the pendant thiolactone groups located in the central circular zone and one primary amino group of said at least one amino-containing compound or between one of the pendant primary groups located in the central circular zone and one thiolactone group of said at least one thiolactone-containing compound; and (7) initiating thiol-induced polymerization of the second polymerizable composition to graft said at least one photochromic vinylic monomer onto the crosslinked polymer network, thereby obtaining an unprocessed photochromic contact lens having a central photochromic zone that has a diameter of about 13 mm or less and is concentric with the central axis of the unprocessed photochromic contact lens and capable of undergoing reversible change from a colorless or light-colored state to a colored state upon exposure to UV/HEVL radiation.

The invention provides in another aspect photochromic contact lenses obtained according to a method of the invention.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" or "SiHy contact lens" refers to a contact lens comprising a silicone hydrogel material.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

A "siloxane" or "silicone", as known to a person skilled in the art, interchangeably refers to a moiety of —Si—O—Si— where each Si atom carries at least two substituents (organic groups) or a molecule having at least one moiety of —Si—O—Si—.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.5% by weight at room temperature (i.e., a temperature of about 21° C. to about 27° C.).

The term "insoluble", in reference to a compound or material in a solvent, means that the compound or material can be dissolved in the solvent to give a solution with a concentration of less than 0.01% by weight at room temperature (as defined above).

The term "ethylenically unsaturated group" is employed herein in a broad sense and is intended to encompass any groups containing at least one >C=C<group. Exemplary ethylenically unsaturated groups include without limitation (meth)acryloyl

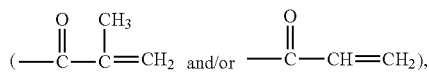

allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, e.g., UV/visible light irradiation, or the like. Thermal curing or actinic curing methods are well-known to a person skilled in the art.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

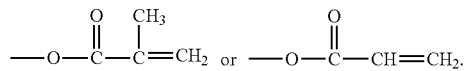

An "(meth)acrylamido monomer" refers to a vinylic monomer having one sole group of

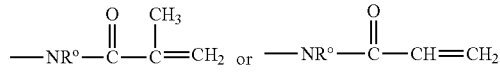

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=CH$_2$) that is directly attached to the nitrogen atom of the amide group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A "polysiloxane segment" or "polydiorganosiloxane segment" interchangeably refers to a polymer chain segment (i.e., a divalent radical) of

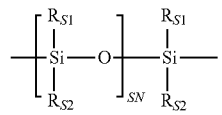

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—$OR^\circ$ (in which alk is $C_1$-$C_6$ alkylene diradical, $R^\circ$ is H or $C_1$-$C_4$ alkyl and $\gamma 1$ is an integer from 1 to 10); a $C_2$-$C_{40}$ organic radical having at least one functional group selected from the group consisting of hydroxyl group (—OH), carboxyl group (—COOH), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl; and a photochromic organic radical having a photochromic group.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "photochromic vinylic monomer" refers to a vinylic monomer that has one colorless (or light-colored) form and one colored form and can undergo reversible change from the colorless form (or light-colored form) (or so-called "deactivated form" to the colored form (or so-called "activated form") upon exposure to UV/HEVL radiation.

The term "colorless or light-colored stated" or "inactivated state" in reference to a photochromic contact lens means the original state of the photochromic contact lens before the photochromic contact lens is irradiated with UV/HEVL light. In this state, the photochromic contact lens typically is colorless or shows a faint color as observed by a naked eye.

The term "colored stated" or "activated state" in reference to a photochromic contact lens means a state of the photochromic contact lens when the photochromic contact lens is being irradiated with UV/HEVL light. In this state, the photochromic contact lens typically shows a dark color as observed by a naked eye.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 nm to 700 nm.

A free radical initiator can be either a photoinitiator or a thermal initiator. A "photoinitiator" refers to a chemical that initiates free radical crosslinking/polymerizing reaction by the use of UV and/or visible light. A "thermal initiator" refers to a chemical that initiates radical crosslinking/polymerizing reaction by the use of heat energy.

The term "acyl germanium photoinitiator" refers to an organogermanium compound that is a germanium-based Norrish Type I photoinitiator and comprises at least one acrylcarbonyl group connected to germanium. Examples of such acyl germanium photoinitiators are described in U.S. Pat. Nos. 7,605,190 and 10,324,311.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), C$_1$-C$_4$ alkyl, C$_1$-C$_4$ alkoxy, C$_1$-C$_4$ alkylthio (alkyl sulfide), C$_1$-C$_4$ acylamino, C$_1$-C$_4$ alkylamino, di-C$_1$-C$_4$ alkylamino, and combinations thereof.

The term "terminal ethylenically-unsaturated group" refers to one ethylenically-unsaturated group at one of the two ends of the main chain (or backbone) of an organic compound as known to a person skilled in the art.

A "blending vinylic monomer" refers to a vinylic monomer capable of dissolving both hydrophilic and hydrophobic components of a polymerizable composition to form a solution.

"Post-curing surface treatment", in reference to a SiHy contact lens, means a surface treatment process that is performed after the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a SiHy contact lens or a SiHy material as well known to a person skilled in the art.

A "thiolactone group" refers to a monovalent radical that is obtained that is obtained by removing a hydrogen atom from an unsubstituted or substituted dihydro-2(3H)-thiophenone (i.e.,

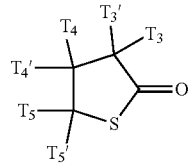

in which T$_3$, T$_3$', T$_4$, T$_4$', T$_5$, and T$_5$' independent of one another are H, NH$_2$ or a monovalent organic radical having 1 to 4 carbon atoms).

A "UV-absorbing vinylic monomer" refers to a compound comprising an ethylenically-unsaturated group and a UV-absorbing moiety which can absorb or screen out UV radiation in the range from 200 nm to 400 nm as understood by a person skilled in the art.

A "HEVL-absorbing vinylic monomer" refers to a compound comprising an ethylenically-unsaturated group and a HEVL-absorbing moiety which can absorb or screen out HEVL (high-energy-violet-light) radiation in the range from 380 nm to 440 nm as understood by a person skilled in the art.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T"), "UVB transmittance" or "UVB % T", and "violet-transmittance" or "Violet % T" are calculated by the following formula.

UVA % $T$=Average % Transmission between 315 nm and 380 nm×100

UVB % $T$=Average % Transmission between 280 nm and 315 nm×100

Violet % $T$=Average % Transmission between 380 nm and 440 nm×100

The intrinsic "oxygen permeability", Dk$_i$, of a material is the rate at which oxygen will pass through a material. As used in this application, the term "oxygen permeability (Dk)" in reference to a hydrogel (silicone or non-silicone) or a contact lens means a corrected oxygen permeability (Dk$_c$) which is measured at about 34-35° C. and corrected for the surface resistance to oxygen flux caused by the boundary layer effect according to the procedures described in ISO 18369-4. Oxygen permeability is conventionally expressed in units of barrers, where "barrer" is defined as [(cm$^3$ oxygen)(cm)/(cm$^2$)(sec)(mm Hg)]×10$^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

The term "modulus" or "elastic modulus" in reference to a contact lens or a material means the tensile modulus or Young's modulus which is a measure of the stiffness of a contact lens or a material in tension. A person skilled in the art knows well how to determine the elastic modulus of a SiHy material or a contact lens. For example, all commercial contact lenses have reported values of elastic modulus.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, radiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a material or a contact lens means that the material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

The term "central axis" in reference to a contact lens means a line passing through the geometrical centers of the anterior and posterior surfaces of the contact lens.

In general, the invention is directed to a method for making photochromic contact lenses, in particular, SiHy contact lenses, only the central pupillary regions of which can undergo a reversible color change upon exposure to UV/HEVL-radiation. The invention is partly based on the discovery that thiolactone chemistry can be conveniently used in making photochromic contact lenses with a photochromic central pupillary region. It is found that by adding a thiolactone-containing vinylic monomer into a lens-forming composition, the polymer matrix of a resultant contact lens can have pendant thiolactone groups which can be aminolyzed by a primary amine into pendant thiol groups which in turn can be used to induce graft polymerization of a photochromic vinylic monomer to the polymer matrix based on thiol-click chemistry. The steps of aminolysis of thiolactone groups and thiol-induced graft polymerization of a photochromic vinylic monomer can be conveniently and efficiently carried out in a spatially-controlled manner thereby forming a photochromic contact lens with a photochromic central pupillary region. Such a method of the invention is free of any use and handling of viscous polymerizable composition.

The invention, in one aspect, provides a method for producing photochromic contact lenses, comprising the steps of: (1) obtaining a first polymerizable fluid composition, wherein the first polymerizable fluid composition comprises (i) at least one polymerizable material, (ii) at least one first free-radical initiator, and (iii) at least one first thiolactone-containing vinylic monomer having a thiolactone group or at least one first amino-containing vinylic monomer having a primary amino group; (2) introducing the first polymerizable fluid composition into a lens mold, wherein the lens mold comprises a male mold half having a first molding surface and a female mold half having a second molding surface, wherein the male and female mold halves are configured to receive each other such that a mold cavity is formed between the first and second molding surfaces and the first polymerizable fluid composition is enclosed in the mold cavity when the mold is closed; (3) curing thermally or actinically the first polymerizable fluid composition in the mold cavity of the lens mold to form an unprocessed contact lens having a crosslinked polymer network with pendant thiolactone groups or pendant primary amino groups; (4) separating the lens mold into the male and female mold halves, with the unprocessed contact lens adhered onto a lens-adhered mold half which is one of the male and female mold halves; (5) applying a second polymerizable fluid composition onto a central circular region on the surface of the unprocessed contact lens adhered on the lens-adhered mold half, wherein the second polymerizable fluid composition comprises (i) at least one photochromic vinylic monomer, (ii) at least one amino-containing compound having a primary amino group or at least one thiolactone-containing compound having a thiolactone group, and (iii) at least one second free-radical initiator, wherein if the first polymerizable fluid composition comprses said at least one first thiolactone-containing vinylic monomer, the second polymerizable fluid composition comprises said at least one amino-containing compound, wherein if the first polymerizable fluid composition comprses said at least one first amino-containing vinylic monomer, the second polymerizable fluid composition comprises said at least one thiolactone-containing compound; (6) allowing the second polymerizable fluid composition penetrating and diffusing into the crosslinked polymer network located in a central circular zone, thereby forming pendant thiol groups each of which is formed between one of the pendant thiolactone groups located in the central circular zone and one primary amino group of said at least one amino-containing compound or between one of the pendant primary groups located in the central circular zone and one thiolactone group of said at least one thiolactone-containing compound; and (7) initiating thiol-induced polymerization of the second polymerizable composition to graft said at least one photochromic vinylic monomer onto the crosslinked polymer network, thereby obtaining an unprocessed photochromic contact lens having a central photochromic zone that has a diameter of about 13 mm or less and is concentric with the central axis of the unprocessed photochromic contact lens and capable of undergoing reversible change from a colorless or light-colored state to a colored state upon exposure to UV/HEVL radiation.

In another aspect, the invention provides a method for producing photochromic contact lenses, comprising the steps of: (1) obtaining a third polymerizable fluid composition, wherein the third polymerizable fluid composition comprises (i) at least one polymerizable material, (ii) at least one first free-radical initiator, and (iii) at least one reactive polymerizable material that comprises at least one first reactive functional group in addition to at least one ethylenically unsaturated group, wherein said at least one first reactive functional group is —COOH,

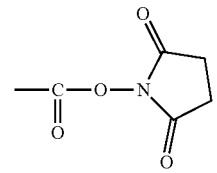

—NHR$_{N2}$, —NCO, —OH, —CHO,

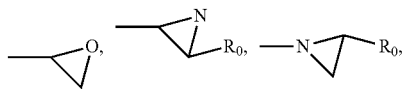

or combinations thereof, wherein R$_0$ is hydrogen or methyl and R$_{N2}$ is hydrogen, a linear or branched C$_1$-C$_{15}$ alkyl, cyclohexyl, cyclopentyl, a substituted or unsubstituted phenyl, or a substituted- or unsubstituted-phenyl-C$_1$-C$_6$ alkyl or combinations thereof; (2) introducing the third polymerizable fluid composition into a lens mold, wherein the lens mold comprises a male mold half having a first molding surface and a female mold half having a second molding surface, wherein the male and female mold halves are configured to receive each other such that a mold cavity is formed between the first and second molding surfaces and the first polymerizable fluid composition is enclosed in the mold cavity when the mold is closed; (3) curing thermally or actinically the third polymerizable fluid composition in the mold cavity of the lens mold to form an unprocessed contact lens having a crosslinked polymer network with pendant first reactive functional groups; (4) separating the lens mold into the male and female mold halves, with the unprocessed contact lens adhered onto a lens-adhered mold half which is one of the male and female mold halves; (5) applying a reactive fluid composition onto a central circular region on the surface of the unprocessed contact lens adhered on the lens-adhered mold half, wherein the reactive fluid composition comprises at least one reactive photochromic compound having a second functional group and optionally a coupling agent and/or a catalyst, wherein the second reactive functional group is co-reactive with one first reactive functional group in the presence or absence of a coupling agent under coupling reactions to form a covalent linkage and is

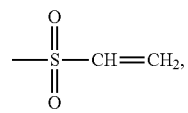

—COOH, —NHR$_{N2}$,

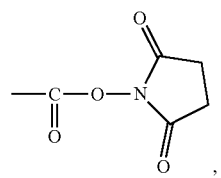

NHR$_{N2}$,

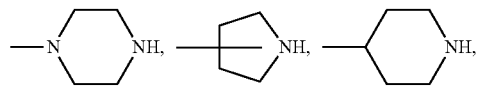

—NCO, —OH, —SH, —CHO,

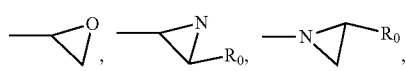

or combinations thereof; and (6) allowing the reactive fluid composition penetrating and diffusing into the crosslinked polymer network located in a central circular zone, thereby covalently attaching at least one reactive photochromic compound to unprocessed contact lens in a central zone that has a diameter of about 13 mm or less and is concentric with the central axis of the unprocessed contact lens.

Preferably, a method of the invention further comprises the steps of removing the unprocessed photochromic contact lens from the lens-adhered mold half and of subjecting the unprocessed photochromic contact lens to one or more post-molding processes selected from the group consisting of extraction, hydration, surface treatment, packaging, sterilization, and combinations thereof.

Any polymerizable materials known or suitable for forming contact lenses can be used in the invention.

In one embodiment, the first (or third) polymerizable fluid composition is for forming a non-silicone hydrogel and said at least one polymerizable material is either (1) a first monomer mixture comprising (a) at least one hydrophilic vinylic monomer and (b) at least one component selected from the group consisting of at least one non-silicone vinylic crosslinker, a non-silicone hydrophobic vinylic monomer, a UV-absorbing vinylic monomer, a HEVL-absorbing vinylic monomer, and combinations thereof; or (2) a reactive mixture comprising (a) one or more water-soluble non-silicone prepolymers and optionally (b) at least one component selected from the group consisting of a hydrophilic vinylic monomer, a non-silicone vinylic crosslinker, a non-silicone hydrophobic vinylic monomer, a UV-absorbing vinylic monomer, a HEVL-absorbing vinylic monomer, and combinations thereof.

In another embodiment, the first (or third) polymerizable fluid composition is for forming a silicone hydrogel and said at least one polymerizable material is a second monomer mixture comprising (a) at least one silicone-containing vinylic monomer, (b) at least one polysiloxane vinylic crosslinker, at least one non-silicone vinylic crosslinker, or both, (c) at least one hydrophilic vinylic monomer, and optionally (d) at least one component selected from the group consisting of a non-silicone hydrophobic vinylic monomer, a UV-absorbing vinylic monomer, a HEVL-absorbing vinylic monomer, and combinations thereof.

In accordance with the invention, a reactive polymerizable material can be a vinylic crosslinker or a vinylic monomer, so log n as it comprises at least one first reactive functional group in addition to at least one ethylenically unsaturated group, wherein said at least one first reactive functional group is —COOH,

—NHR$_{N2}$, —NCO, —OH, —CHO, O

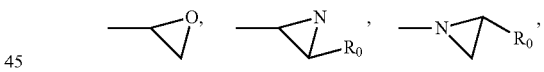

or combinations thereof, wherein R$_0$ is hydrogen or methyl and R$_{N2}$ is hydrogen, a linear or branched C$_1$-C$_{15}$ alkyl, cyclohexyl, cyclopentyl, a substituted or unsubstituted phenyl, or a substituted- or unsubstituted-phenyl-C$_1$-C$_6$ alkyl or combinations thereof. Examples of such reactive polymerizable materials can be any one of those described later in this application.

Any hydrophilic vinylic monomer can be used in the invention. Examples of preferred hydrophilic vinylic monomers are hydrophilic (meth)acrylamido monomer (as described later in this application), hydrophilic (meth)acryloxy monomer (as described later in this application), hydrophilic N-vinyl amide monomer (as described later in this application), methylene-containing pyrrolidone monomers (i.e., pyrrolidone derivatives each having a methylene group connected to the pyrrolidone ring at 3- or 5-position) (as described later in this application), vinyl ether monomers (as described later in this application), allyl ether monomers (as described later in this application), phosphorylcholine-containing vinylic monomers (as described later in this application), allyl alcohol, N-2-hydroxyethyl vinyl carbamate, N-vinyloxycarbonyl-β-alanine (VINAL), N-vinyloxycarbonyl-α-alanine, and combinations thereof.

Any water-soluble non-silicone prepolymers can be used in the invention. Examples of water-soluble non-silicone prepolymers include without limitation: a water-soluble actinically-crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Any non-silicone vinylic crosslinkers can be used in the invention. Examples of preferred non-silicone vinylic crosslinkers are described later in this application.

Any non-silicone hydrophobic vinylic monomers can be used in the invention. Examples of preferred hydrophobic non-silicone vinylic monomers can be non-silicone hydrophobic acrylic monomers (e.g., alkyl (meth)acrylates as described below, cycloalkyl (meth)acrylates as described below, phenyl methacrylate, (meth)acrylonitrile, etc.), fluorine-containing acrylic monomers (e.g., perfluorohexyl-ethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxy-alkanes (e.g., vinyl ethyl ether, propyl vinyl ether, n-butyl vinyl ether, isoputyl vinyl ether, cyclohexyl vinyl ether, t-butyl vinyl ether, etc.), substituted or unsubstituted styrenes as described below, vinyl toluene, vinyl chloride, vinylidene chloride, 1-butene, and mixtures thereof.

Any suitable perfluoro-substituted-$C_2$-$C_{12}$ alkyl (meth)acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, and combinations thereof.

In a preferred embodiment, one or more hydrophobic non-silicone acrylic monomers and/or substituted or unsubstituted styrenes can be used in the invention as a reactive diluent (i.e., a blending vinylic monomer) for solubilizing other polymerizable components in a polymerizable composition of the invention.

Examples of such non-silicone hydrophobic acrylic monomers and substituted or unsubstituted styrenes include methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, and combinations thereof. More preferably, methyl methacrylate, tert-butyl methacrylate, cyclohexyl methacrylate, isobornyl acrylate, isobornyl methacrylate, or a combination thereof is used in the invention. Even more preferably, methyl methacrylate, tert-butyl methacrylate, cyclohexyl methacrylate, or a combination thereof is used in the invention.

The term "UV/HEVL-absorbing vinylic monomer" refers to a vinylic monomer that can absorb UV light and high-energy-violet-light (i.e., light having wavelength between 380 nm and 440 nm). Examples of UV-absorbing vinylic monomers and UV/HEVL-absorbing vinylic monomers are known to a person skilled in the art and are disclosed in the patents and patent application publications, e.g., U.S. Pat. No. 9,315,669, US 2018-0081197 A1, etc.

Any suitable UV-absorbing vinylic monomers and UV/HEVL-absorbing vinylic monomers can be used in the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxy-propyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5'-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5- chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Any silicone-containing vinylic monomer can be used in the invention. Examples of preferred silicone-containing vinylic monomers can be silicone-containing (meth)acrylamido monomers, silicone-containing (meth)acryloxy monomers, silicone-containing vinylcarbonato monomers, or silicone-containing vinylcarbamato monomers, each of which comprises a bis(trialkylsilyloxy)alkylsilyl group, a tris(trialkylsilyloxy)-silyl group, or a polysiloxane chain having 2 to 30 siloxane units and terminated with an alkyl, hydroxyalkyl or methoxyalkyl group. Such preferred silicone-containing vinylic monomers can be obtained from the commercial suppliers, or alternatively prepared according to known procedures, e.g., similar to those described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827, or by reacting a vinylic monomer having a reactive functional group (e.g., an acid chloride, acid anhydride, carboxyl, hydroxyl, amino, epoxy, isocyanate, aziridine, azlactone, or aldehyde group) with a siloxane-containing compound a reactive group selected from the group consisting of a hydroxyalkyl, an aminoalkyl, an alkylaminoalkyl, a carboxyalkyl, an isocyanatoalkyl, an epoxyalkyl, and an aziridinylalkyl, in the presence or absence of a coupling agent under coupling reaction conditions well known to a person skilled in the art.

In a preferred embodiment, said at least one silicone-containing vinylic monomer comprises at least one silicone-containing (meth)acrylamido monomer having a bis(trialkylsilyloxy)alkylsilyl group, a tris(trialkylsilyloxy)silyl group, or a polysiloxane chain having 2 to 30 siloxane units and terminated with an alkyl, hydroxyalkyl or methoxyalkyl group.

Examples of such preferred silicone-containing (meth) acrylamido monomers include without limitation those described later in this application.

In another preferred embodiment, said at least one silicone-containing vinylic monomer comprises at least one silicone-containing (meth)acryloxy monomer having a bis(trialkylsilyloxy)alkylsilyl group, a tris(trialkylsilyloxy)silyl group, or a polysiloxane chain having 2 to 30 siloxane units and terminated with an alkyl, hydroxyalkyl or methoxyalkyl group. Examples of such preferred silicone-containing (meth)acryloxy monomers include without limitation those described later in this application.

Any polysiloxane vinylic crosslinkers can be used in the invention. Examples of preferred polysiloxane vinylic crosslinkers include without limitation α,ω-(meth)acryloxy-terminated polydimethylsiloxanes; α,ω-(meth)acrylamido-terminated polydimethylsiloxanes; α,ω-vinyl carbonate-terminated polydimethylsiloxanes; α,ω-vinyl carbamate-terminated polydimethylsiloxanes; bis-3-methacryloxy-2-hydroxypropyloxypropyl polydimethylsiloxanes; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. patent Ser. No. 10/081,697.

Another class of preferred polysiloxane vinylic crosslinkers are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416, 132, 5,449,729, 5,760,100, 7,423,074, 8,529,057, 8,835,525, 8,993,651, 9,187,601, 10,301,451, and 10,465,047.

Any hydrophilic vinylic monomers can be used in the invention. Examples of preferred hydrophilic vinylic monomers are hydrophilic (meth)acrylamido monomer (as described later in this application), hydrophilic (meth)acryloxy monomer (as described later in this application), hydrophilic N-vinyl amide monomer (as described later in this application), methylene-containing pyrrolidone monomers (i.e., pyrrolidone derivatives each having a methylene group connected to the pyrrolidone ring at 3- or 5-position) (as described later in this application), vinyl ether monomers (as described later in this application), allyl ether monomers (as described later in this application), phosphorylcholine-containing vinylic monomers (as described later in this application), allyl alcohol, N-2-hydroxyethyl vinyl carbamate, N-vinyloxycarbonyl-β-alanine (VINAL), N-vinyloxycarbonyl-α-alanine, and combinations thereof.

In another preferred embodiment, said at least one hydrophilic vinylic monomer comprises at least one hydrophilic (meth)acrylamido monomer, preferably having 3 to 10 carbon atoms. Examples of preferred hydrophilic (meth)acrylamido monomers are described later in this application. It is believed that such hydrophilic (meth)acrylamido monomers can be used in increasing the glass transition temperature of a resultant silicone hydrogel material. It is also understood that any hydrophilic (meth)acrylamido monomers other than those specifically described later in this application can also be used in this invention.

In another preferred embodiment, said at least one hydrophilic vinylic monomer comprises at least one hydrophilic N-vinyl amide monomer. Examples of preferred hydrophilic N-vinyl amide monomers are described later in this application. It is understood that any hydrophilic N-vinyl amide monomers other than those specifically described later in this application can also be used in this invention.

In another preferred embodiment, said at least one hydrophilic vinylic monomer comprises at least one hydrophilic (meth)acryloxy monomer, preferably having 3 to 10 carbon atoms. Examples of preferred hydrophilic (meth)acryloxy monomers are described later in this application. It is understood that any hydrophilic (meth)acryloxy monomers other than those specifically described later in this application can also be used in this invention.

In a preferred embodiment, the sum of the amounts of components (a), (b) and (c) in the second monomer mixture is at least about 60% (preferably at least about 65%, more preferably at least about 70%, even more preferably at least about 75%) by weight relative to the total weight of all polymerizable materials in the first polymerizable fluid composition.

In accordance with the invention, a free radical initiator can be one or more photoinitiators or thermal initiators. The first free-radical initiator and the second free-radical initiator can be the same or different. One can be a thermal initiator and the other can be a photoinitiator.

Any thermal initiators can be used in the invention. Suitable thermal initiators are known to the skilled artisan and comprise, for example peroxides, hydroperoxides, azobis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis (2-amidinopropane) dihydrochloride (VAZO 50), 2,2'-azobis(2,4-dimethylvaleronitrile) (VAZO 52), 2,2'-azobis (isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173@ and Darocur 2959@, acylgermanium photoinitiators.

Examples of benzoylphosphine initiators include 2,4,6-trimethylbenzoyldiphenyl-phosphine oxide; bis-(2,6-dichlorobenzoyl)-4-N-propylphenylphosphine oxide; and bis-(2,6-dichlorobenzoyl)-4-N-butylphenylphosphine oxide.

Any acylgermanium photoinitiators can be used in this invention, so long as they are capable of initiating a free-radical polymerization under irradiation with a light source including a light in the region of about 420 to about 500 nm. Examples of acylgermanium photoinitiators are acylgermanium compounds described in U.S. Pat. No. 7,605,190. Preferably, said at least one first and/or second free-radical initiator comprises at least one of the following acylgermanium compounds.

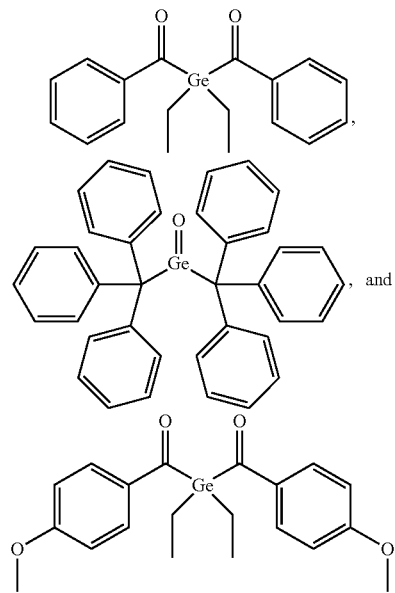

Any thiolactone-containing compound can be used in this invention. Examples of preferred thiolactone-containing compounds include without limitation 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 5-methyltetrahydrothiophen-2-one, 5-ethyldihydro-2(3H)-thiophenone, 4-methyldihydrothiophen-2(3H)-one, 4,4-dimethyldihydro-2(3H)-thiophenone, 3,5-dimethyldihydro-2(3H)-thiophenone, 3,3-dimethyldihydro-2(3H)-thiophenone, 4,5-dimethyldihydro-2(3H)-thiophenone, 3-acetyldihydro-2(3H)-thiophenone, 4-carboxyldihydro-2(3H)-thiophenone (i.e., thioparaconic acid), N-acetyl homocysteine thiolactone, N-propionyl homocysteine thiolactone, N-butyryl homocysteine thiolactone, and N-carboxybutyryl homocysteine thiolactone (or 4-oxo-4-[(tetrahydro-2-oxo-3-thienyl)amino]-butanoic acid), erdosteine (i.e., {2-oxo-2-[(2-oxotetrahydro-3-thienyl) amino]ethyl}sulfanyl)acetic acid), and combinations thereof. Thiolactone-containing compounds can be obtained from the commercial suppliers or prepared according to known procedures.

Any thiolactone-containing vinylic monomers can be used in this invention. Examples of preferred thiolactone-containing vinylic monomers include without limitation N-(meth)acryloylhomocysteine thiolactone, N-[(meth)acryloxy-$C_2$-$C_6$ alkoxycarbonyl]-homocysteine thiolactone, N-[(meth)acrylamido-$C_2$-$C_6$ alkoxycarbonyl]-homocysteine thiolactone, N-[(meth)acryloxy-$C_2$-$C_6$ alkanoyl]homocysteine thiolactone, N-[(meth)acrylamido-$C_2$-$C_6$ alkanoyl]homocysteine thiolactone, N-[4-(meth)acryloxymethylcyclohexyl]methoxy-carbonyl-homocysteine thilactone, 5-[(meth)acryloxyethyl)]dihydro-2(3H)-thiophenone (γ-thiolactone (meth)acrylate from SPECIFIC POLYMERS, France), 4-[(meth)acryloxy-$C_2$-$C_6$-alkylaminocarbonyl]dihydro-2(3H)-thiophenone, 4-[(meth)acrylamido-$C_2$-$C_6$-alkylamino-carbonyl]dihydro-2(3H)-thiophenone, N-(allyloxy)carbonylhomocysteine thiolactone, α-(N-(4-vinylbenzenesulfonyl)homocysteine-γ-thiolactone, and combinations thereof. Thiolatone-containing vinylic monomers can be obtained from commercial suppliers. Alternatively, they can be prepared from homocysteine thiolactone, thioparaconic acid, or other thiolactone-containing compounds, according to known procedures, e.g., those described by D. Frank, et al., in *Tetrahedron* 2016, 72: 6616-6625, by C. Remzi Becer et al. in *Polym. Chem.*, 2018, 9: 4507-4516, and by P. Espeel, F. E. Du Prez in *Euro. Polym. J.* 2015, 62: 247-272, as well as those references cited by these three papers.

For example, a thiolactone-containing vinylic monomer is a reaction product of a thiolactone-containing compound having a first reactive functional group and a vinylic monomer having a second reactive functional group, wherein the first reactive functional group is primary amino (—$NH_2$), isocyanato (—NCO), or carboxyl (—COOH) group, wherein the second reactive functional group is carboxyl group, acid chloride group, acid anhydride group, primary amino group, isocyanato group, hydroxyl group, or epoxide group, wherein the first reactive functional group reacts with the second reactive functional group under coupling reaction conditions to form a covalent linkage of —CONH—, —OCONH—, —NHCONH—, —$CH_2$CH(OH)$CH_2$NH—, —NHCO—, or —$CH_2$CH(OH)$CH_2$CO—. Examples of a thiolactone-containing compound having a first reactive functional group is described above or later in this application. Examples of a vinylic monomer having a second reactive functional group are described later in this application.

Any amino-containing compound having a primary amino group can be used in the invention. Examples of preferred amino-containing compounds include without limitation, $C_3$-$C_{10}$ alkylamines, $C_5$-$C_1$ cycloalkylamines, amino acids, aminoalcohols, an amino-containing vinylic monomer having a primary amino group (any one described later in this application), and combinations thereof.

Any $C_3$-$C_{10}$ alkylamines and $C_5$-$C_{10}$ cycloalkylamines can be used in the invention. Examples of preferred $C_3$-$C_{10}$ alkylamines and $C_5$-$C_{10}$ cycloalkylamines include without limitation propylamine, isopropylamine, butylamine, sec-butylamine, isobutylamine, tert-butylamine, tert-butylamine, tert-amylamine, amylamine, isopentylamine, 1,2-dimethylpropylamine, 2,2-dimethyl-1-propanamine, hexylamine, heptylamine, 2-ethyl-1-hexylamine, 1-propylbutylamine, cyclopentylamine, cyclopentylmethanamine, cyclohexylamine, cyclohexanemethylamine, 1-cyclohexylethylamine, 2-cyclohexylethylamine, 1-amino-1-methylcyclohexane, 2-methylcyclohexylamine, 4-methylcyclohexylamine, etc.

Any amino acids having one sole primary amino group can be used in the invention. Examples of amino acids include without limitation glycine, alanine, valine, isoleucine, leucine, 2-aminoisobutyric acid, 4-aminobutyric acid, 3-aminoisobutyyric acid, 3-amino-butyric acid, β-alanine, 1-amino-3-cyclopentane carboxylic acid, 3-aminocyclohexanecarboxylic acid, etc.

Any aminoalcohols (i.e., compounds having one amino group and one or more hydroxyls) include without limitation 1-aminoethanol, 2-aminoethanol, 3-amino-1-propanol, 1-amino-2-propanol, 4-amino-1-butanol, 2-amino-1-butanol, 2-amino-3-methyl-1-butanol, 4-Amino-2-methyl-1-butanol, 5-amino-1-pentanol, 3-amino-2-pentanol, 6-amino-2-hydroxymethyl-1-hexanol, 4-amino-1-piperazineethanol, etc.

A first polymerizable fluid composition of the invention can also comprise other necessary components known to a person skilled in the art, such as, for example, visibility tinting agent (e.g., one or more polymerizable dyes, pigments, or mixtures thereof), antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), mold releasing agent, and mixtures thereof, as known to a person skilled in the art.

In accordance with the invention, a first polymerizable fluid composition of the invention can be a solution, a solventless blend (i.e., a fluid composition free of any non-reactive diluent—organic solvent). It can be prepared according to any techniques known to a person skilled in the art.

For example, a first polymerizable fluid composition of the invention can be prepared by adding an amino-containing or thiolactone-containing vinylic monomer into any known lens formulations.

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, vifilcon A, etc.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, stenfilcon A, etc.

Where a first polymerizable fluid composition of the invention is a solution. It can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. Preferably, a polymerizable composition is a solution of all the desirable components in water, 1,2-propylene glycol, a polyethyleneglycol having a molecular weight of about 400 Daltons or less, or a mixture thereof.

Where a first polymerizable fluid composition of the invention is a solventless blend, it can be prepared by mixing all polymerizable components and other necessary component. A solventless polymerizable composition typically comprises at least one blending vinylic monomer as a reactive solvent for dissolving all other polymerizable components of the solventless polymerizable composition. Examples of preferred blending vinylic monomers are described above and later in this application. Preferably, methyl methacrylate is used as a blending vinylic monomer in preparing a solventless polymerizable composition.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the polymerizable composition.

Methods of manufacturing mold sections for cast molding a contact lens are generally well known to those of ordinary skill in the art. The process of the present invention is not limited to any particular method of forming a mold. In fact, any method of forming a mold can be used in the present invention.

In general, a mold comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the first polymerizable fluid composition can be introduced (dispensed) into a cavity formed by a mold according to any known techniques. A specific amount of a first polymerizable fluid composition is typically dispensed into a female mold half by means of a dispensing device and then a male mold half is put on and the mold is closed. As the mold closes, any excess first polymerizable fluid composition is pressed into an overflow provided on the female mold half (or alternatively on the male mold half).

The closed mold containing the first polymerizable fluid composition subsequently is cured (i.e., polymerized) thermally or actinically.

In a preferred embodiment, the curing step is carried out actinically, i.e., irradiating the closed mold containing the first polymerizable fluid composition with a UV or visible light, as known to a person skilled in the art, to produce a molded unprocessed contact lens.

Where the first polymerizable composition comprises at least one member selected from the group consisting of a UV-absorbing vinylic monomer, a HEVL-absorbing vinylic monomer, a polymerizable photochromic compound, the free radical initiator is a visible light photoinitiator (e.g., a benzoylphosphine initiator and/or an acylgermanium photoinitiator) and crosslinking is initiated upon exposure to a visible light in a region between 420 nm to 500 nm to crosslink the polymerizable components in the first polymerizable fluid composition to form molded unprocess contact lenses. Light source can be any ones emitting light in the 420-500 nm range sufficient to activate acylgermanium photoinitiators. Blue-light sources are commercially available and include: the Palatray CU blue-light unit (available from Heraeus Kulzer, Inc., Irvine, Calif.), the Fusion F450 blue light system (available from TEAMCO, Richardson, Tex.), Dymax Blue Wave 200, LED light sources from Opsytec (435 nm, 445 nm, 460 nm), and the GE 24" blue fluorescent lamp (available from General Electric Company, U.S.). A preferred blue-light source is the LED from Opsytec (those described above).

In a preferred embodiment, the curing step is carried out thermally in an oven to produce a molded unprocessed contact lens. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, e.g., under $N_2$ or Ar atmosphere. Preferably, the oven with the molds therein is purged with nitrogen by flowing nitrogen gas through the oven. It is understood that the thermal curing step can be carried out at one or more curing temperatures as known to person skilled in the art and illustrated in Examples.

Where the curing step is carried out thermally, preferably any organic solvent present in the first polymerizable composition has a boiling point of lower than 105° C. (preferably about 100° C. or lower, more preferably about 95° C. or lower, even more preferably about 90° C. or lower). The thermal curing step is carried out in an oven at one or more curing temperatures of from about 45° C. to about 100° C. under a nitrogen environment for at least 45 minutes (preferably at least 60 minutes, more preferably at least 90 minutes, even more preferably at least 120 minutes) to form an unprocessed contact lens, wherein the nitrogen environment in the oven is maintained by flowing nitrogen gas through the oven at a first flow rate. The method of the invention further comprises a post-curing treatment process that include the steps of: raising oven temperature to a post-curing temperature of about 105° C. or higher (preferably at least about 110° C., more preferably at least about 115° C., even more preferably at least about 120° C.) while increasing the flow rate of nitrogen gas through the oven to a second flow rate which is at least about 1.5 folds (preferably at least about 2.0 folds, more preferably at least about 3.0 folds, even more preferably at least about 4.0 folds) of the first flow rate; heating the lens mold with the unprocessed contact lens therewithin in the oven at the post-curing temperature under nitrogen gas flow through the oven at the second flow rate for at least about 30 minutes (preferably at least about 60 minutes, more preferably at least about 90 minutes, even more preferably at least about 120 minutes).

After curing and optionally the post-curing treatment, the molds can be opened according to any techniques known to a person skilled in the art. After the mold is separated, the molded unprocessed contact lens adheres to one of the male and female mold halves.

In accordance with the invention, a second polymerizable fluid composition comprises at least one photochromic vinylic monomers and at least one second free-radical initiator (as described above).

Any photochromic vinylic monomers can be used in this invention. Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline) benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro(benzindoline)naphthoxazines, polymerizable spiro(indoline)-benzoxazines, polymerizable diarylethenes, and combinations thereof, as disclosed in U.S. Pat. Nos. 4,929, 693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

Various photochromic compounds are disclosed in the patents and published patent applications and can be obtained from commercial sources or prepared by following the procedures described in the patents and literatures. Examples of preferred photochromic compounds include without limitation naphthopyrans, indeno-fused naphthopyrans (i.e., indeno-naphthopyrans), heterocyclic ring-fused naphthopyrans, benzopyrans, phenanthropyrans, quinopyrans, quinolinopyrans, fluoroanthenopyrans, anthracene-fused pyrans, tetracene-fused pyrans, spiro(benzindoline) naphthopyrans, spiro(indoline)naphthopyrans, spiro (indoline)-benzopyrans, spiro(indoline)quinopyrans, spiro (indoline)pyrans, naphthoxazines, spirobenzopyrans, spirobenzothiopyrans, naphthacenediones, benzoxazines, spirooxazines, naphthoxazines, spiro(benzindoline)naphthoxazines, spiro(indoline)naphthoxazines, spiro(indoline) pyrido-benzoxazines, spiro(indoline) benzoxazines, spiro (benzindoline)-benzoxazines, spiro(benzindoline) pyridobenzoxazines, spiro(indoline)fluoranthenoxazines, spiro(indoline)-quinoxazines, spiropiperidine-naphthopyrans, piro(indoline)pyronobenzo-xazinones, benzospiropyrans, naphthospiropyrans, spirobenzoxazine-pyrrolopyridines, spironaphthoxazine-pyrrolopyrridines, spirooxazepin-benzoxazines, spiro-oxazepin-naphthoxazines, spiro(indoline)benzothiazoloxazines, spiro(indoline)benzopyrroloxazines, spiro(indoline)quinazolino-oxazines, spiro (indoline)-anthracenobenzoxazines, benzofuro-benzopyrans, benzothienobenzopyrans, naphthofurobenzopyrans, benzopyrano-fusednaphthopyrans, spiro(isoindoline)-naphthoxazines, spiro(isoindoline)benzoxazines, etc. Such photochromic compounds are disclosed in U.S. Pat. Nos. 3,100, 778, 3,562,172, 3,567,605, 3,578,602, 3,671,543, 4,215,010, 4,342,668, 4,440,672, 4,634,767, 4,636,561, 4,637,698, 4,699,473, 4,719,296, 4,720,547, 4,772,700, 4,784,474, 4,785,097, 4,816,584, 4,818,096, 4,826,977, 4,831,142, 4,880,667, 4,929,693, 4,931,219, 4,931,221, 4,959,471, 4,980,089, 4,986,934, 5,055,576, 5,066,818, 5,110,922, 5,114,621, 5,139,707, 5,166,345, 5,171,636, 5,180,524, 5,186,867, 5,200,116, 5,238,931, 5,238,981, 5,244,602, 5,274,132; 5,340,857, 5,369,158, 5,384,077, 5,395,567, 5,399,687, 5,405,958, 5,411,679, 5,429,774, 5,451,344, 5,458,814; 5,458,815, 5,464,567, 5,466,398, 5,514,817; 5,520,853, 5,552,090, 5,552,091, 5,565,147, 5,573,712;

5,578,252, 5,585,042, 5,623,005, 5,637,262, 5,637,709, 5,645,767; 5,650,098, 5,651,923, 5,656,206; 5,658,500, 5,658,501, 5,674,432, 5,698,141, 5,723,072, 5,728,758, 5,730,908, 5,744,070, 5,759,450, 5,783,116, 5,801,243, 5,808,063, 5,811,034, 5,831,090, 5,833,885, 5,869,658; 5,879,592, 5,891,368, 5,955,520; 5,961,892; 5,981,634, 5,998,520, 6,004,486, 6,017,121, 6,018,059; 6,019,914, 6,022,495, 6,022,497; 6,030,555, 6,034,193, 6,065,836, 6,106,744, 6,106,744, 6,107,395, 6,113,814, 6,146,554; 6,149,841, 6,153,126, 6,221,284, 6,248,264; 6,296,785, 6,315,928; 6,342,459; 6,348,604, 6,353,102, 6,414,057, 6,478,988, 6,630,597, 7,556,750, 7,584,630, 7,999,989, 8,158,037, 8,697,770, 8,698,117, 8,741,188, 9,029,532, 9,028,728, 9,052,438, 9,097,916, 9,465,234, 9,487,499, 9,904,074, 10,197,707, 10,501,446, 10,532,997, and 10,502,998 and are also described in the texts, Techniques in Chemistry, Volume III. "Photochromism", Chapter 3 (Glenn H. Brown, Editor, John Wiley and Sons, Inc., New York, 1971) and in "Chromic Phenomena: Technological Applications of Colour Chemistry" (P. Bamfield, RSC Books (2001)). Derivatives of these compounds that include various Substituents can be Synthesized from this teaching by people skilled in the art.

In a preferred embodiment, a polymerizable photochromic compound is used in the invention.

Alternatively, a photochromic vinylic monomer can be obtained by reacting a reactive (meth)acrylamido or (meth)acryloxy monomer having a first reactive functional group (—COCl, —COBr, —COOH,

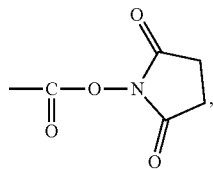

—NHR$_{N2}$, —NCO, —OH, —CHO,

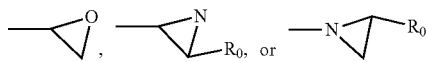

in which $R_0$ is hydrogen or methyl and $R_{N2}$ is hydrogen, a linear or branched $C_1$-$C_{15}$ alkyl, cyclohexyl, cyclopentyl, a substituted or unsubstituted phenyl, or a substituted- or unsubstituted-phenyl-$C_1$-$C_6$ alkyl) with a reactive photochromic compound having a second reactive functional group (

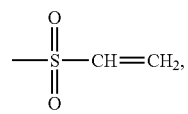

—COOH,

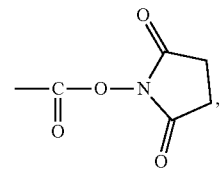

—NHRN$_2$,

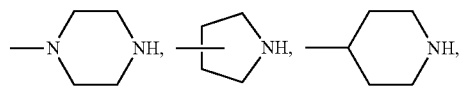

—NCO, —OH, —SH, —CHO,

in the absence or presence of a coupling agent (i.e., having two of the reactive functional groups listed above) under well known coupling reaction conditions, to form a photochromic compound.

Non-limiting examples of coupling reactions under various reaction conditions between a pair of matching co-reactive functional groups selected from the group preferably consisting of primary group, secondary amino group, hydroxyl group, carboxyl group, acid anhydride group, aldehyde group, isocyanate group, epoxy group, aziridine group, azlactone group and thiol group, are given below for illustrative purposes. A primary/secondary amino group reacts with aldehyde or ketone group to form a Schiff base which may further be reduced into an amine bond; a primary/secondary amino group —NHR (in which R is hydrogen or $C_1$-$C_6$ alkyl) reacts with an acid chloride or bromide group or with an acid anhydride group to form an amide linkage (—CO—NR—); an amino group —NHR reacts with a N-hydroxysuccinimide ester group to form an amide linkage; an amino group —NHR reacts with a carboxylic acid group in the presence of a coupling agent—carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide to form an amide linkage; an amino group —NHR reacts (ring-opening) with an azlactone group to form an alkylene-diamido linkage (—CONH—CR$^1$R$^2$—(CH$_2$)$_{p1}$—CONH—); an amino group —NHR reacts with an isocyanate group to form a urea linkage (—NR—C(O)—NH— with R as defined above); an amino group —NHR reacts with an epoxy or aziridine group to form an amine bond (—C—NR—); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form a linkage (—CONH—CR$^1$R$^2$—(CH$_2$)P$_1$—CO—S—); a thiol group reacts with an ene group or vinylsulfonyl group based on thiol-ene "click" reaction under thiol-ene reaction conditions to form a thioether linkage (—S—); a thiol group reacts with a (meth)acryloyl group based on Michael Addition under appropriate reaction conditions to form a thioether linkage.

The reactions conditions for the above described coupling reactions are taught in textbooks and are well known to a person skilled in the art.

Any coupling agents, each of which has two reactive functional groups, may be used in the coupling reactions. A coupling agent having two reactive functional groups can be: a diisocyanate compound; a di-acid halide compound; a di-carboxylic acid compound; a di-carboxylic acid anhydride compound; a diamine compound; a diol compound; a di-epoxy compound; a di-aziridine compound; di-azlactone compound; a di-ene compound; a divinylsulfone compound; a di-thiol compound; a thiolactone compound; an amino acid compound; a hydroxy-containing amine compound; an amine compound having one hydroxyl or ketone group; a hydroxy-containing carboxylic acid compound; a mercaptane having a hydroxyl, carboxyl or amino group.

For example, a diisocyanate, di-carboxylic acid (preferably a di-carboxylic acid anhydride), di-aziridine, di-epoxy, or di-azlactone compound can be used in the coupling of the first and second reactive functional groups when they are different or same and are selected from the group consisting of hydroxyl, primary amino, secondary amino, and thiol groups; a di-amine, di-hydroxyl, di-thiol, hydroxy-containing amine, or hydroxy-containing thiol compound can be used in the coupling of the first and second reactive functional groups when they are different or same and are selected from the group consisting of isocyanate, epoxy, aziridine, and carboxylic acid groups; a di-epoxy compound can be used in the coupling of the first and second reactive functional groups when they both are carboxylic acid groups; a diamine compound can be used in the coupling of the first and second reactive functional groups when they both are aldehyde groups. A person skilled in the art knows well how to select one or more coupling agents, based on selectivity and/or differential reactivity of a given reactive functional group, to link the first and second reactive functional groups to form a photochromic polydiorganosiloxane vinylic crosslinker of the invention.

Examples of commercially available di-carboxylic acid anhydrides include without limitation succinic acid anhydride, methylsuccinic anhydride, 2,2-dimethylsuccinic anhydride, 2,3-dimethylsuccinic acid, glutaric acid anhydride, 3,3-dimethylglutaric anhydride, 2,2-dimethylglutaric anhydride, 3-methylglutaric anhydride, 3,3-tetramethylglutaric anhydride, diglycolic anhydride, adipic anhydride, etc.

Any suitable C$_3$-C$_{24}$ di-carboxylic acid compounds can be used in the invention. Examples of preferred di-carboxylic acid compounds include without limitation a linear or branched C$_3$-C$_{24}$ aliphatic dicarboxylic acid, a C$_5$-C$_{24}$ cycloaliphatic or aliphatic-cycloaliphatic dicarboxylic acid, a C$_6$-C$_{24}$ aromatic or araliphatic dicarboxylic acid, a dicarboxylic acid which contains amino or imido groups or N-heterocyclic rings, and combinations thereof. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-biphenyldicarboxylic acid, 2,2'-biphenyl-dicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxylphenyl)-methane.

Any suitable diacid halides can be used in the invention. Examples of preferred diacid halide include without limitations fumaryl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, dimer acid chloride, and combinations thereof.

Any suitable diamines can be used in the invention. An organic diamine can be a linear or branched C$_2$-C$_{24}$ aliphatic diamine, a C$_5$-C$_{24}$ cycloaliphatic or aliphatic-cycloaliphatic diamine, or a C$_6$-C$_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, N-methyl-1,3-diaminopropane, N-methylethylenediamine, N-ethylethylenediamine, N-isopropyl-1,3-propanediamine, N-propyl-1,3-propanediamine, N-butylethylenediamine, 2,2-dimethyl-1,3-propanediamine, 1,4-butanediamine, 1,5-pentanediamine, hexamethylenediamine, 2-Methyl-1,5-pentanediamine, 1,6-hexamethylenediamine, N,N'-dimethyl-1,6-hexamethylenediamine, 2,2,4 (2,4,4)-trimethyl-1,6-hexanediamine, 1,3-diamino-2-propanol, 1,2-diaminoethane-1,2-diol, 1,1-diaminoethane-1,2-diol, 1,4-diamino-2,3-butanediol, 1,3-cyclopentanediamine, 1,4-diaminocyclohexane, 1,3-Bis(aminomethyl)cyclohexane, 4,4'-diaminodicyclohexylmethane, 4,4'-methylenebis(2-methylcyclohexylamine), isophorone diamine (3-aminomethyl-3,5,5-trimethylcyclohexylamine), m-xylylene diamine, p-xylylene diamine, piperazine, 1-(2-aminoethyl)piperazine, 1,4-bis(3-aminopropyl)piperazine, 2-piperazinoethylamine, 1-Boc-piperazine, 4-(2-aminoethyl)-1-Boc-piperazine, 1-(2-N-Boc-aminoethyl)piperazine, 4-(2-aminoethyl)-1-Boc-piperazine, 4-aminopiperidine, 3-aminopiperidine, 4-aminomethylpiperidine, 2-aminomethylpiperidine, 1-Boc-piperidine-4-carboxaldehyde, 1-Boc-piperidine-4-acetaldehyde, etc.

Any suitable C$_4$-C$_{24}$ diisocyanates can be used in the invention. Examples of preferred diisocyanates include without limitation tetramethylene diisocyanate, pentamethylene diisocyanate, hexamethylene diisocyanate, heptamethylene diisocyanate, 1,6-diisocyanato-2,2,4-trimethylhexane, octamethylene diisocyanate, dodecamethylene diisocyanate, cyclohexane diisocyanate, 1,3-bis-(4,4'-isocyantomethyl)cyclohexane, isophorone diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, etc.

Any suitable di-epoxy compounds can be used in the invention. Examples of preferred di-epoxy compounds are neopentyl glycol diglycidyl ether, 1,3-butadiene diepoxide, 1,4-butanediol diglycidyl ether, 1,2,7,8-diepoxyoctane, 3,4- epoxycyclohexylmethyl-3,4-epoxy-cyclohexane, 3,4-epoxycyclohexylmethyl-3,4-epoxycyclohexane carboxylate, vinylcyclohexene dioxide, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, bis[4-(glycidyloxy)phenyl]methane, Bisphenol A diglycidyl ether (2,2-Bis[4-(glycidyloxy)phenyl]-propane), Bisphenol A propoxylate diglycidyl ether, and combinations thereof.

Any suitable $C_2$-$C_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, various cyclohexanediols, 1,4-bis(2-hydroxyethyl)piperazine, bisphenol A, bisphenol F, 4,4'-methylenediphenol, and combination thereof.

Any amino acids can be used in the invention. Examples of amino acids include without limitation glycine, proline, alanine, valine, isoleucine, leucine, 2-aminoisobutyric acid, 4-aminobutyric acid, 3-aminoisobutyyric acid, 3-amino-butyric acid, β-alanine, 1-amino-3-cyclopentane carboxylic acid, 3-aminocyclohexanecarboxylic acid, pyrrolidine-3-carboxylic acid, 4-piperidinecarboxylic acid, 3-piperidinecarboxylic acid, 1-piperazineacetic acid, etc.

Examples of compounds having one amino group and one hydroxyl or aldehyde group (or ketone group) include without limitation 1-piperazinepropanol, 2-[2-(1-piperazinyl)ethoxy]-ethanol, 4-amino-1-piperazineethanol, 4-piperidinemethanol, 1-Boc-piperidine-4-carboxaldehyde, 4-formylpiperidine, N-Boc-4-piperidineacetaldehyde, etc.

Preferred reactive (meth)acrylamido or (meth)acryloxy monomers without limitation include those described later in this application.

Preferred photochromic compounds without limitation include without limitation those compounds that are described later in this application and can be obtained from commercial suppliers or prepared according to procedures described in the patents discussed above and in the texts described above.

In a preferred embodiment, a second polymerizable fluid composition further comprises a hydrophilic vinylic monomer (any one of those described in this application).

In another preferred embodiment, a second polymerizable fluid composition further comprises at least one polymeric non-reactive diluent, wherein said at least one polymeric non-reactive diluent is a poly($C_2$-$C_4$ alkyleneoxide) polymer. A polymeric non-reactive diluent is present in an amount sufficient to dissolve said at least photochromic vinylic monomer.

In accordance with the invention, a poly($C_2$-$C_4$ alkyleneoxide) polymer refers to a polymer of $T_1$-$(EO)_{e2}(PO)_{p2}(BO)_{b2}$-$T_2$ in which: $T_1$ and $T_2$ independent of each other is hydrogen or a $C_1$-$C_4$ alkyl (preferably hydrogen or methyl); EO is a divalent radical of ethyleneoxide (—$CH_2$—$CH_2$—O—) PO is a divalent radical of propyleneoxide

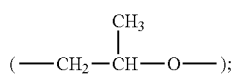

BO is a divalent radical of butyleneoxide

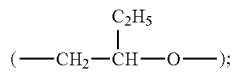

e2 is zero or an integer of from 5 to 65; p2 is zero or an integer of from 5 to 52; b2 is zero or integer of from 5 to 30; wherein if p2 is not zero, b2 is zero; wherein if b2 is not zero, p2 is zero and e2 is not zero; wherein (e2+p2+b2) is a value to provide the poly($C_2$-$C_4$ alkyleneoxide) polymer with a number average molecular weight of from about 300 to about 3000 Daltons (preferably from about 400 to about 2500 Daltons, more preferably from about 400 to about 2000 Daltons, even more preferably from about 400 to about 1500 Daltons).

Examples of preferred poly($C_2$-$C_4$ alkyleneoxide) polymers includes poly(ethyleneoxide) ("PEO"), poly(propyleneoxide) ("PPO"), poly(ethyleneoxide)-poly(propyleneoxide) di-block copolymer ("PEO-PPO"), poly(ethyleneoxide)-poly(propyleneoxide)-poly(ethyleneoxide) tri-block copolymer ("PEO—PPO-PEO"), poly(propyleneoxide)-poly(ethyleneoxide)-poly(propyleneoxide) tri-block copolymer ("PPO-PEO-PPO"), poly(ethyleneoxide)-poly(butyleneoxide) di-block copolymer ("PEO-PBO"), poly(ethyleneoxide)-poly(butyleneoxide)-poly(ethyleneoxide) tri-block copolymer ("PEO—PBO-PEO"), poly(butyleneoxide)-poly(ethyleneoxide)-poly(butyleneoxide) tri-block copolymer ("PBO-PEO-PBO"), and mixtures thereof. Those preferred poly($C_2$-$C_4$ alkyleneoxide) polymers, such as PEO, PPO, PEO-PPO, PEO—PPO-PEO and PPO-PEO-PPO, can be obtained from commercial sources or synthesized according to known methods. PEO-PBO, PEO—PBO-PEO and PBO-PEO-PBO can be synthesized according to procedures described in U.S. Pat. No. 8,318,144.

A second polymerizable fluid composition can further comprise an organic solvent (any those described in this application).

A specific amount of a second polymerizable fluid composition is dispensed in a central region on the surface of the unprocessed contact lens adhered on the lens-adhered mold half according to any techniques known to a person skilled in the art.

After the second polymerizable fluid composition has penetrated and diffused into the crosslinked polymer network, aminolysis of thiolactone groups can occur, resulting the formation of thiol groups covalently attached to the polyer matrix of the unprocessed contact lens. Then, thiol-induced polymerization of the second polymerizable composition can be initiated to graft said at least one photochromic vinylic monomer and optionally at least one hydrophilic vinylic monomer onto the crosslinked polymer network, thereby obtaining an unprocessed photochromic contact lens having a central photochromic zone that has a diameter of about 13 mm or less and is concentric with the central axis of the unprocessed photochromic contact lens and capable of undergoing reversible change from a colorless or light-colored state to a colored state upon exposure to UV/HEVL radiation.

In accordance with the invention, the thiol-induced polymerization of the second polymerizable composition can be initiated thermally if the second free-radical initiator is a thermal initiator or by UV/visible light irradiation if the second free-radical initiator is a photo-initiator.

Preferably, the thiol-induced polymerization of the second polymerizable composition is initiated with a spatial limitation of UV/Visible radiation (i.e., actinic radiation).

A "spatial limitation of UV/visible radiation" refers to an act or process in which UV/visible light is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6). The mask or screen allows to spatially projects a beam of radiation (e.g., UV/visible radiation) having a circular cross-sectional profile with a diameter of about 13 mm or smaller defined by the projection contour of the mask or screen. The projected beam of radiation (e.g., UV/visible radiation) limits radiation impinging on second polymerizable fluid composition located in the path of the projected beam. Any second polymerizable composition outside of the path of the projected beam will not be polymerized and can be removed in extraction and/or hydration processes.

The unprocessed photochromic contact lens adhered on the lens-adhered mold half can be removed from the lens-adhered mold half and then subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The photochromic contact lenses can also be subjected to further processes, such as, for example, surface treatment (for example, such as, plasma treatment, chemical treatments, the grafting of hydrophilic monomers or macromers onto the surface of a lens, Layer-by-layer coating, in-package crosslinking of a thermally-reactive hydrophilic polymeric material, etc.); packaging in lens packages with a packaging solution which can contain about 0.005% to about 5% by weight of a wetting agent (e.g., a hydrophilic polymer), a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), or an in-package-coating material; sterilization such as autoclave at from 118 to 124° C. for at least about 30 minutes; and the like.

Preferred surfaces treatments are LbL coating such as those described in U.S. Pat. Nos. 6,451,871, 6,719,929, 6,793,973, 6,811,805, and 6,896,926, plasma treatment, in-package-coating such as those disclosed in U.S. Pat. Nos. 8,557,334, 8,529,057 and 9,505,184. A preferred plasma treatment is those processes in which an ionized gas is applied to the surface of an article as described in U.S. Pat. Nos. 4,312,575 and 4,632,844.

The photochromic contact lens is hydrated in water or an aqueous solution to replace the liquid extraction medium, according to any method known to a person skilled in the art.

The hydrated and/or surface-treated photochromic contact lens can further subject to further processes, such as, for example, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

A photochromic SiHy contact lens of the invention has an oxygen permeability of preferably at least about 40 barrers, more preferably at least about 60 barrers, even more preferably at least about 80 barrers (at about 35° C.).

A photochromic contact lens of the invention has an elastic modulus of about 1.5 MPa or less, preferably about 1.2 MPa or less, more preferably from about 0.3 MPa to about 1.0 MPa (at a temperature of from about 22° C. to 28° C.).

A photochromic contact lens of the invention further has an equilibrium water content of from about 15% to about 75%, more preferably from about 20% to about 70% by weight, even more preferably from about 25% to about 65% by weight (at room temperature) when fully hydrated. The equilibrium water content of a photochromic contact lens can be measured according to the procedure disclosed in Example 1.

In a further aspect, the invention provides a photochromic contact lens obtained by the method of the invention.

All of the various embodiments of the molds, polymerizable composition, and spatial limitation of radiation, and contact lens of the invention described above can be used in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing photochromic contact lenses, comprising the steps of:
   (1) obtaining a first polymerizable fluid composition, wherein the first polymerizable fluid composition comprises (i) at least one polymerizable material, (ii) at least one first free-radical initiator, and (iii) at least one first thiolactone-containing vinylic monomer having a thiolactone group or at least one first amino-containing vinylic monomer having a primary amino group;
   (2) introducing the first polymerizable fluid composition into a lens mold, wherein the lens mold comprises a male mold half having a first molding surface and a female mold half having a second molding surface, wherein the male and female mold halves are configured to receive each other such that a mold cavity is formed between the first and second molding surfaces and the first polymerizable fluid composition is enclosed in the mold cavity when the mold is closed;
(3) curing thermally or actinically the first polymerizable fluid composition in the mold cavity of the lens mold to form an unprocessed contact lens having a crosslinked polymer network with pendant thiolactone groups or pendant primary amino groups;
(4) separating the lens mold into the male and female mold halves, with the unprocessed contact lens adhered onto a lens-adhered mold half which is one of the male and female mold halves;
(5) applying a second polymerizable fluid composition onto a central circular region on the surface of the unprocessed contact lens adhered on the lens-adhered mold half, wherein the second polymerizable fluid composition comprises (i) at least one photochromic vinylic monomer, (ii) at least one amino-containing compound having a primary amino group or at least one thiolactone-containing compound having a thiolactone group, and (iii) at least one second free-radical initiator, wherein if the first polymerizable fluid composition comprises said at least one first thiolactone-containing vinylic monomer, the second polymerizable fluid composition comprises said at least one amino-containing compound, wherein if the first polymerizable fluid composition comprises said at least one first amino-containing vinylic monomer, the second polymerizable fluid composition comprises said at least one thiolactone-containing compound;
(6) allowing the second polymerizable fluid composition penetrating and diffusing into the crosslinked polymer network located in a central circular zone, thereby forming pendant thiol groups each of which is formed between one of the pendant thiolactone groups located in the central circular zone and one primary amino group of said at least one amino-containing compound or between one of the pendant primary groups located in the central circular zone and one thiolactone group of said at least one thiolactone-containing compound; and
(7) initiating thiol-induced polymerization of the second polymerizable composition to graft said at least one photochromic vinylic monomer onto the crosslinked polymer network, thereby obtaining an unprocessed photochromic contact lens having a central photochromic zone that has a diameter of about 13 mm or less and is concentric with the central axis of the unprocessed photochromic contact lens and capable of undergoing reversible change from a colorless or light-colored state to a colored state upon exposure to UV/HEVL radiation.
2. The method of embodiment 1, wherein the first polymerizable fluid composition is for forming a non-silicone hydrogel, wherein said at least one polymerizable material is a first monomer mixture comprising (a) at least one first hydrophilic vinylic monomer and (b) at least one component selected from the group consisting of at least one non-silicone vinylic crosslinker, a non-silicone hydrophobic vinylic monomer, a UV-absorbing vinylic monomer, a HEVL-absorbing vinylic monomer, and combinations thereof.
3. The method of embodiment 2, wherein said at least one first hydrophilic vinylic monomer comprises at least one hydroxyl-containing vinylic monomer, N,N-dimethylarylamide, N-vinylpyrrolidone, at least one methylene-containing pyrrolidone monomer, or combinations thereof.
4. The method of embodiment 2 or 3, wherein said at least one polymerizable material comprises at least 50% by weight of at least one hydroxyl-containing vinylic monomer, relative to the total weight of all polymerizable materials present in the first polymerizable fluid composition.
5. The method of embodiment 2 or 3, wherein said at least one polymerizable material comprises at least 55% by weight of at least one hydroxyl-containing vinylic monomer, relative to the total weight of all polymerizable materials present in the first polymerizable fluid composition.
6. The method of embodiment 2 or 3, wherein said at least one polymerizable material comprises at least 60% by weight of at least one hydroxyl-containing vinylic monomer, relative to the total weight of all polymerizable materials present in the first polymerizable fluid composition.
7. The method of embodiment 2 or 3, wherein said at least one polymerizable material comprises at least 65% by weight of at least one hydroxyl-containing vinylic monomer, relative to the total weight of all polymerizable materials present in the first polymerizable fluid composition.
8. The method of any one of embodiments 3 to 7, wherein said at least one hydroxyl-containing vinylic monomer are selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, trimethylammonium 2-hydroxy propyl (meth)acrylate hydrochloride, N-2-hydroxylethyl (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis(2-hydroxyethyl) (meth)acrylamide, N-tris(hydroxymethyl) methyl (meth)acrylamide, N-2-hydroxyethyl vinyl carbamate, and combinations thereof.
9. The method of any one of embodiments 3 to 7, wherein said at least one hydroxyl-containing vinylic monomer are selected from the group consisting of hydroxyethyl (meth)acrylate, glycerol (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, di(ethylene glycol) (meth)acrylate, N-2-hydroxyethyl vinyl carbamate, and combinations thereof.
10. The method of any one of embodiments 3 to 7, wherein said at least one hydroxyl-containing vinylic monomer are selected from the group consisting of hydroxyethyl (meth)acrylate, glycerol (meth)acrylate, N-2-hydroxyethyl (meth)acrylamide, and combinations thereof.
11. The method of embodiment 1, wherein the first polymerizable fluid composition is for forming a non-silicone hydrogel, wherein said at least one polymerizable material is a reactive mixture comprising (a) one or more water-soluble non-silicone prepolymers and optionally (b) at least one component selected from the group consisting of a hydrophilic vinylic monomer, a non-silicone vinylic crosslinker, a non-silicone hydrophobic vinylic monomer, a UV-absorbing vinylic monomer, a HEVL-absorbing vinylic monomer, and combinations thereof.

12. The method of embodiment 11, wherein the one or more water-soluble non-silicone prepolymers are water-soluble actinically-crosslinkable poly(vinyl alcohol) prepolymers each of which comprises (a1) at least 60% by mole of repeating units of

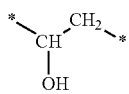

and (a2) repeating units of

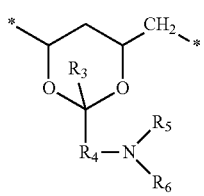

in which: $R_3$ and $R_5$ independent of each other are H or $C_1$-$C_4$ alkyl; $R_4$ is a $C_1$-$C_4$ alkylene divalent radical; $R_6$ is a monovalent organic radical having an acrylic group.

13. The method of embodiment 1, wherein the first polymerizable fluid composition is for forming a silicone hydrogel, wherein said at least one polymerizable material is a second monomer mixture comprising (a) at least one silicone-containing vinylic monomer, (b) at least one polysiloxane vinylic crosslinker, at least one non-silicone vinylic crosslinker, or both, (c) at least one second hydrophilic vinylic monomer, and optionally (d) at least one component selected from the group consisting of a non-silicone hydrophobic vinylic monomer, a UV-absorbing vinylic monomer, a HEVL-absorbing vinylic monomer, and combinations thereof.

14. The method of embodiment 13, wherein said at least one second hydrophilic vinylic monomer comprises at least one hydrophilic (meth)acrylamido monomer.

15. The method of embodiment 14, wherein said at least one hydrophilic (meth)acrylamido monomer having 3 to 8 carbon atoms relative to the total weight of the polymerizable composition.

16. The method of embodiment 14, wherein said at least one hydrophilic (meth)acrylamido monomer is selected from the group consisting of (meth)acrylamide, N-methyl (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis(2-hydroxyethyl) (meth)acrylamide, N-tris(hydroxymethyl) methyl (meth)acrylamide, 2-(meth)acrylamido-glycolic acid, 3-(meth)acrylamidopropionic acid, 4-(meth)acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 5-(meth)acrylamidopentanoic acid, 3-(meth)acrylamidohaxanoic acid, 4-(meth)acrylamido-3,3-dimethylhexanoic acid, (3-(meth)acrylamidophenyl)boronic acid, 3-((3-methacrylamidopropyl)dimethylammonio)-propane-1-sulfonate; 3-((3-acrylamidopropyl)dimethylammonio) propane-1-sulfonate, poly(ethylene glycol)ethyl (meth)acrylamide having a number average molecular weight of up to 700, methoxy-poly(ethylene glycol)ethyl (meth)acrylamide having a number average molecular weight of up to 700, and combinations thereof.

17. The method of any one of embodiments 14 to 16, wherein said at least one hydrophilic (meth)acrylamido monomer comprises N,N-dimethyl (meth)acrylamide, N-ethyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, (meth)acrylamide, or combinations thereof.

18. The method of any one of embodiments 14 to 16, wherein said at least one hydrophilic (meth)acrylamido monomer comprises N,N-dimethyl (meth)acrylamide, N-2-hydroxyethyl (meth)acrylamide, or a combination thereof.

19. The method of any one of embodiments 13 to 18, wherein said at least one second hydrophilic vinylic monomer comprises at least one hydrophilic (meth)acryloxy monomer.

20. The method of embodiment 19, wherein said at least one second hydrophilic (meth)acryloxy monomer is selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, (meth)acrylic acid, ethylacrylic acid, propylacrylic acid, butylacrylic acid, trimethylammonium 2-hydroxy propyl (meth)acrylate hydrochloride, dimethylaminoethyl (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, and combinations thereof.

21. The method of any one of embodiments 13 to 20, wherein said at least one second hydrophilic vinylic monomer comprises at least one hydrophilic N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

22. The method of any one of embodiments 13 to 20, wherein said at least one second hydrophilic vinylic monomer comprises N-vinylpyrrolidone and/or N-vinyl-N-methyl acetamide.

23. The method of any one of embodiments 13 to 22, wherein said at least one second hydrophilic vinylic monomer comprises: (a) at least one methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (b) at least one vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (c) at least one allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (d) at least one phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]-ethyl-2'-(trimethylammonio)-ethylphosphate, 3-[(meth)acryloylamino]propyl-2'-(trimethylammonio) ethylphosphate, 4-[(meth)acryloylamino]butyl-2'-(trimethylammonio)-ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)-ethyl-2'-(triethylammonio)ethylphosphate, 2-((meth)acryloyloxy) ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)-pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)-ethylphosphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (e) allyl alcohol; (f) N-2-hydroxyethyl vinyl carbamate; (g) N-vinyloxycarbonyl-β-alanine (VINAL); (h) N-vinyloxycarbonyl-α-alanine; or (i) combinations thereof.

24. The method of any one of embodiment 13 to 23, wherein said at least one silicone-containing vinylic monomer comprises at least one silicone-containing (meth)acrylamido monomer containing a tris(trialkylsiloxy)silyl group.

25. The method of embodiment 24, wherein said at least one silicone-containing (meth)acrylamido monomer containing a tris(trialkylsiloxy)silyl group is selected from the group consisting of N-[tris(trimethylsiloxy)silylpropyl] (meth)acrylamide, N-[tris(dimethylethylsiloxy)-silylpropyl] (meth)acrylamide, N-[tris(dimethylpropylsiloxy)silylpropyl] (meth)acrylamide, N-[tris(dimethylphenylsiloxy)silylpropyl] (meth)acrylamide, N-(2-hydroxy-3-(3-(tris(trimethyl-silyloxy)silyl)propyloxy)propyl)-2-methyl (meth)acrylamide, N-(2-hydroxy-3-(3-(tris(trimethyl-silyloxy)silyl)propyloxy)propyl) (meth)acrylamide, N,N-bis[2-hydroxy-3-(3-(tris(trimethyl-silyloxy)silyl)propyloxy)propyl]-2-methyl (meth)acrylamide, N,N-bis[2-hydroxy-3-(3-(tris(trimethylsilyloxy)silyl)propyloxy) propyl] (meth)acrylamide, and combinations thereof.

26. The method of any one of embodiments 13 to 25, wherein said at least one silicone-containing vinylic monomer comprises at least one silicone-containing (meth)acrylamido monomer containing a bis(trialkylsilyloxy)-alkylsilyl group.

27. The method of embodiment 26, wherein said at least one silicone-containing (meth)acrylamido monomer containing a bis(trialkylsilyloxy)alkylsilyl group is selected from the group consisting of N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethyl-silyloxy)methylsilyl) propyloxy)-propyl] (meth)acrylamide, N-[2-hydroxy-3-(3-(t-butyl-dimethylsilyl)propyloxy)propyl]-2-methyl acrylamide, a siloxane-containing (meth)acrylamido monomer of one of formula (Ia) to (Ih), and combinations thereof,

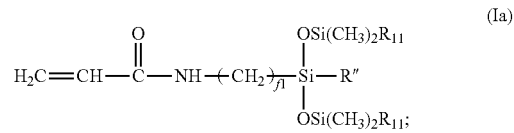
(Ia)

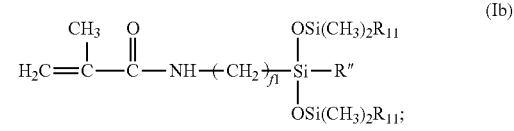
(Ib)

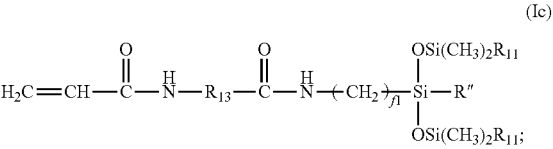
(Ic)

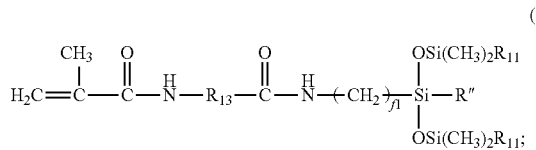
(Id)

-continued

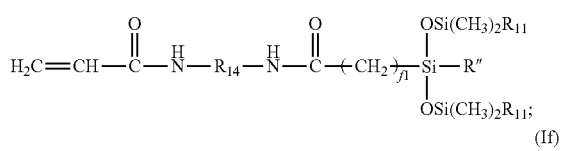
(Ie)

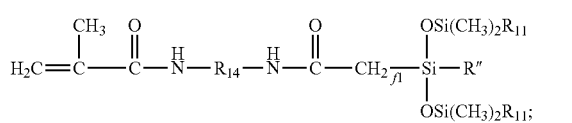
(If)

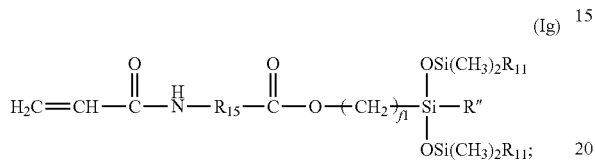
(Ig)

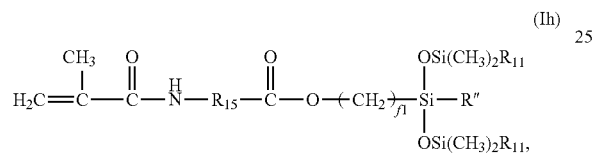
(Ih)

in which $R_{13}$ is a divalent alkylene radical of —$CH_2CH_2$—, —$CH_2CH_2CH_2$—, —$CH_2CH_2CH_2CH_2$—,

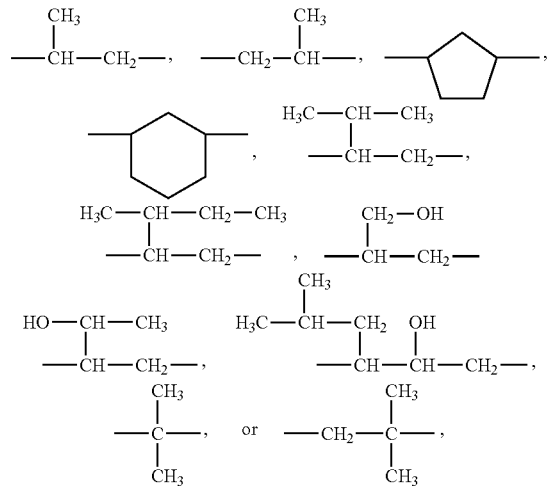

$R_{14}$ is a divalent alkylene radical of —$CH_2CH_2$— or —$CH_2CH_2CH_2$—, and $R_{15}$ is a divalent alkylene radical of

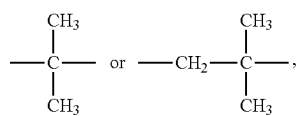

R" and $R_{11}$ independent of each other is $C_1$-$C_4$ alkyl, and f1 is an integer of from 3 to 5.

28. The method of any one of embodiments 13 to 27, wherein said at least one silicone-containing vinylic monomer comprises at least one mono-(meth)acrylamido-terminated oligo- or polysiloxane of formula (IIa)

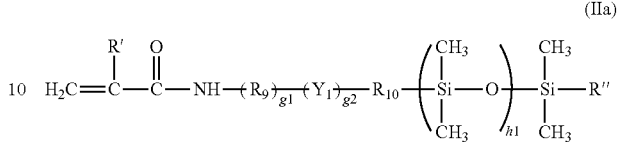
(IIa)

in which R' is hydrogen or methyl, R" independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y_1$ is a linkage of

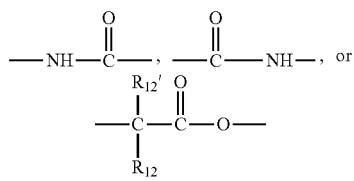

in which $R_{12}$ and $R_{12}'$ independent of each other are $C_1$-$C_6$ alkyl.

29. The method of embodiment 28, wherein in formula (IIa) h1 is an integer of 3 to 20 (more preferably 3 to 15).

30. The method of embodiment 28 or 29, wherein in formula (IIa) $R_{12}$ and $R_{12}'$ independent of each other are methyl.

31. The method of any one of embodiments 28 to 30, wherein at least one mono-(meth)acrylamido-terminated oligo- or polysiloxane is selected from the group consisting of α-(meth)acryloyl-amidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxy-propyl]-terminated ω-$C_1$-$C_4$-alkyl terminated polydimethylsiloxane, α-[3-(meth)acrylamido-isopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxy-propyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl]terminated ω-$C_1$-$C_4$-alkyl terminated polydimethylsiloxane, N-methyl-N'-(propyl-tetra(dimethylsiloxy)dimethylbutylsilane) (meth)acrylamide, N-(2,3-dihydroxypropane)-N'-(propyltetra(dimethylsiloxy)dimethyl-butylsilane) (meth)acrylamide, (meth)acryloylamido-propyltetra(dimethylsiloxy)-dimethylbutylsilane, and combinations thereof.

32. The method of any one of embodiments 13 to 31, wherein the second monomer mixture comprises at least one polysiloxane vinylic crosslinker selected from the group consisting of: an α,ω-(meth)acryloxy-terminated polydimethylsiloxane; an α,ω-(meth)acrylamido-terminated polydimethylsiloxane; an α,ω-vinyl carbonate-terminated polydimethylsiloxane; an α,ω-vinyl carbamate-terminated polydimethylsiloxane; a bis-3-methacryloxy-2-hydroxypropyloxypropyl polydimethylsiloxane; a reaction product of glycidyl methacrylate with a di-amino-functionalized polydimethylsiloxane; a reaction product of an azlactone-containing vinylic monomer with a di-hydroxyl-functionalized polydimethylsiloxane; and combinations thereof.

33. The method of any one of embodiments 13 to 31, wherein the second monomer mixture comprises at least one polysiloxane vinylic crosslinker of formula (H)

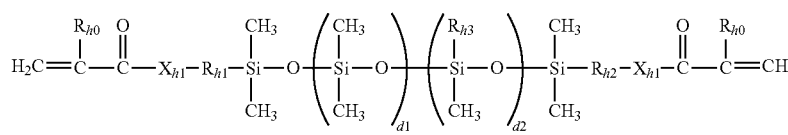

(H)

in which:
d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);
$X_{h1}$ is O or $NR_{hN}$ in which $R_{hN}$ is hydrogen or $C_1$-$C_{10}$-alkyl;
$R_{h0}$ is hydrogen or methyl;
$R_{h1}$ and $R_{h2}$ independently of each other are a substituted or unsubstituted $C_1$-$C_{10}$ alkylene divalent radical or a divalent radical of —$R_{h4}$—O—$R_{h5}$— in which $R_{h4}$ and $R_{h5}$ independently of each other are a substituted or unsubstituted $C_1$-$C_{10}$ alkylene divalent radical; $R_{h3}$ is a monovalent radical of any one of formula (H-a) to (H-e)

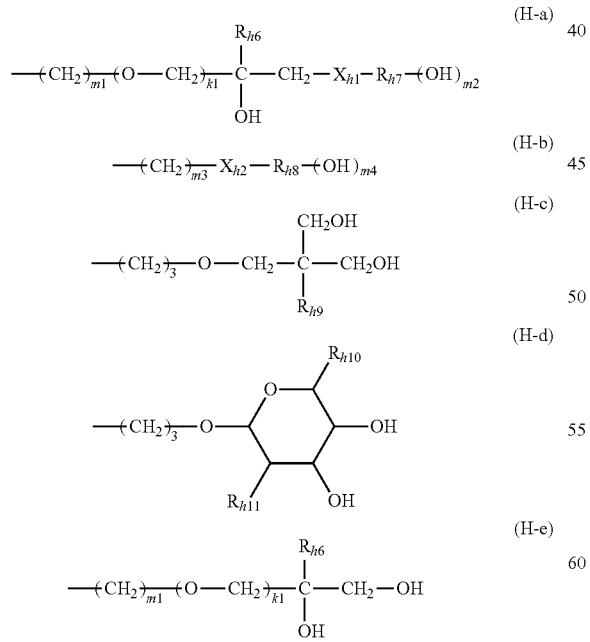

k1 is zero or 1; m1 is an integer of 2 to 4; m2 is an integer of 1 to 5; m3 is an integer of 3 to 6; m4 is an integer of 2 to 5;

$R_{h6}$ is hydrogen or methyl;
$R_{h7}$ is a $C_2$-$C_6$ hydrocarbon radical having (m2+1) valencies;
$R_{h8}$ is a $C_2$-$C_6$ hydrocarbon radical having (m4+1) valencies;
$R_{h9}$ is ethyl or hydroxymethyl;
$R_{h10}$ is methyl or hydromethyl;
$R_{h11}$ is hydroxyl or methoxy;
$X_{h1}$ is a sulfur linkage of —S— or a teriary amino linkage of —$NR_{h12}$— in which $R_{h12}$ is $C_1$-$C_1$ alkyl, hydroxyethyl, hydroxypropyl, or 2,3-dihydroxypropyl; and $X_{h2}$ is a linkage of

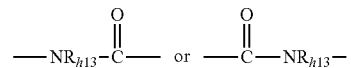

in which $R_{h13}$ is hydrogen or $C_1$-$C_{10}$ alkyl.

34. The method of any one of embodiments 13 to 31, wherein the second monomer mixture comprises (i) at least one polysiloxane vinylic crosslinker having one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (ii) at least one chain-extended polysiloxane vinylic crosslinker having at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

35. The method of any one of embodiments 13 to 31, wherein the second monomer mixture comprises (i) at least one polysiloxane vinylic crosslinker selected from the group consisting of α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxy-propyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxy-propyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamido-propylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxyethoxy-propyl]-terminated polydimethylsiloxane, α,ω-bis[(meth)acryloxyethylamino-carbonyloxy-(polyethylenoxy)propyl]-terminated polydimethylsiloxane, and combinations thereof.

36. The method of any one of embodiments 13 to 31, wherein the second monomer mixture comprises at least one polysiloxane vinylic crosslinker having a polymer chain segment (i.e., a divalent radical) of

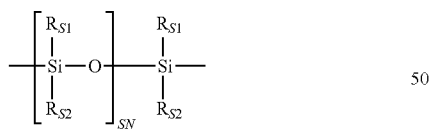

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma1}$—$OR^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl.

37. The method of any one of embodiments 13 to 31, wherein the second monomer mixture comprises at least one polysiloxane vinylic crosslinker of formula (1) or (2)

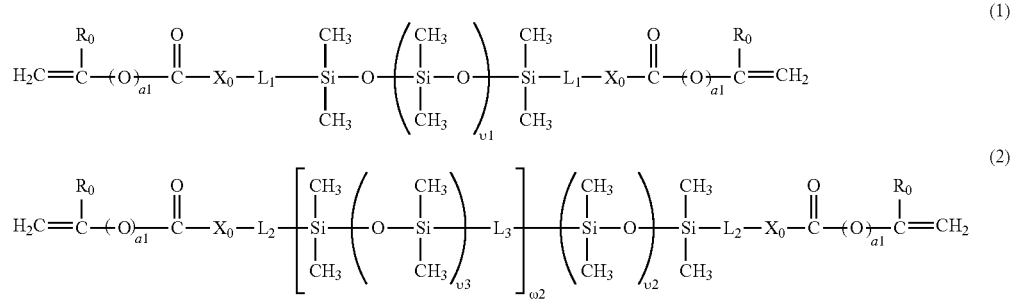

in which:

$R_0$ is H or methyl;

υ1 is an integer of from 30 to 500; υ2 and υ3 independent of each other are an integer of from 5 to 100; ω2 and ω3 independent of each other are an integer of from 1 to 15;

a1 and g1 independent of each other is zero or 1;

$L_1$ is a $C_2$-$C_8$ alkylene divalent radical or a divalent radical of $L_1$'$X_1$-$L_1$"-,

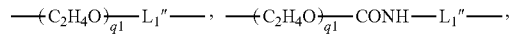
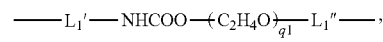
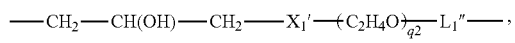
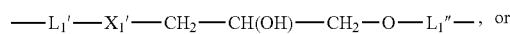
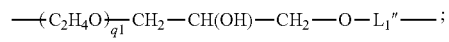

$L_1$' is a $C_2$-$C_8$ alkylene divalent radical which has zero or one hydroxyl group;

$L_1$" is $C_3$-$C_8$ alkylene divalent radical which has zero or one hydroxyl group;

$L_2$ is a divalent radical of

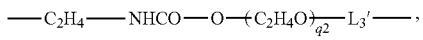
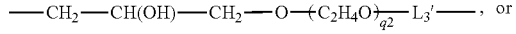
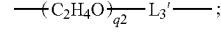

$L_3$ is a divalent radical of

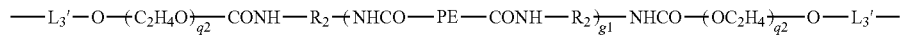

in which PE is a divalent radical of

or

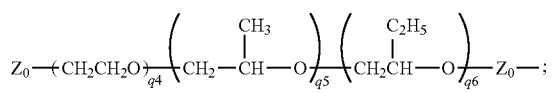

$L_3'$ is $C_3$-$C_8$ alkylene divalent radical;
$R_2$ is a $C_4$-$C_{14}$ hydrocarbon divalent radical;
$R_3$ is a $C_2$-$C_6$ alkylene divalent radical;
$X_o$, $X_1'$, and $X_{o1}$ independent of one another are O or $NR_1$;
$X_1$ is O, $NR_1$, NHCOO, OCONH, $CONR_1$, or $NR_1CO$;
$Z_0$ is a direct bond or a $C_1$-$C_{12}$ alkylene divalent radical.

38. The method of any one of embodiments 13 to 37, wherein the second monomer mixture comprises at least one silicone-containing vinylic monomer of formula (M1) or (M2):

(M1)
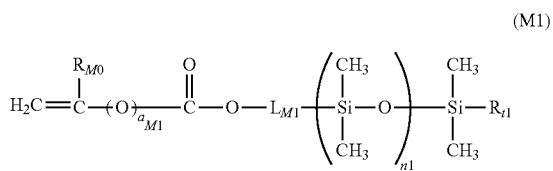

(M2)
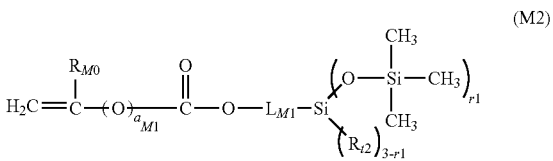

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

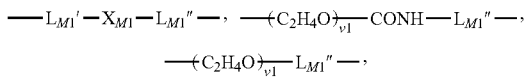

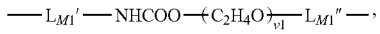

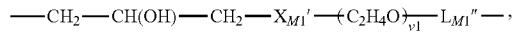

-$L_{M1}'$-$X_{M1}'$—$CH_2$—CH(OH)—$CH_2$—O-$L_{M1}''$- or

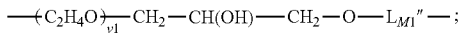

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; v2 is an integer of 0 to 30; n1 is an integer of 3 to 40; and r1 is an integer of 2 or 3.

39. The method of embodiment 38, wherein said at least one silicone-containing vinylic monomer comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)propyloxy)propylbis(trimethylsiloxy)methylsilane, 3-(meth)acryloxy-2-hydroxypropyloxy)propyltris(trimethylsiloxy)silane, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyltris(trimethylsiloxy)silane, 3-[tris(trimethylsiloxy)silyl]-propylvinyl carbamate, 3-[tris(trimethylsiloxy)silyl] propyl allyl carbamate, 3-[tris(trimethylsiloxy)silyl]-propyl vinyl carbonate, or a combination thereof.

40. The method of any one of embodiments 13 to 37, wherein the second monomer mixture comprises at least one silicone-containing vinylic monomer selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-w-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxypropyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated w-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-[(meth)acryloxy-(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

41. The method of any one of embodiments 13 to 40, wherein the sum of the amounts of components (a), (b) and (c) in the second monomer mixture is at least about 60% (preferably at least about 65% by weight relative to the total weight of all polymerizable materials present in the second monomer mixture.
42. The method of any one of embodiments 13 to 40, wherein the sum of the amounts of components (a), (b) and (c) in the second monomer mixture is at least about 65% by weight relative to the total weight of all polymerizable materials present in the second monomer mixture.
43. The method of any one of embodiments 13 to 40, wherein the sum of the amounts of components (a), (b) and (c) in the second monomer mixture is at least about 70% by weight relative to the total weight of all polymerizable materials present in the second monomer mixture.
44. The method of any one of embodiments 13 to 40, wherein the sum of the amounts of components (a), (b) and (c) in the second monomer mixture is at least about 75% by weight relative to the total weight of all polymerizable materials present in the second monomer mixture.
45. The method of any one of embodiments 1 to 44, wherein said at least one polymerizable material comprises at least one non-silicone vinylic crosslinker.
46. The method of any one of embodiments 1 to 44, wherein said at least one polymerizable material comprises at least one non-silicone vinylic crosslinker selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl]phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, and combinations thereof.
47. The method of any one of embodiments 1 to 44, wherein said at least one polymerizable material comprises at least one non-silicone vinylic crosslinker selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, or a combination thereof.
48. The method of any one of embodiments 1 to 47, wherein said at least one polymerizable material comprises at least one non-silicone hydrophobic vinylic monomer.
49. The method of any one of embodiments 1 to 47, wherein said at least one polymerizable material comprises at least one $C_1$-$C_8$ alkyl (meth)acrylate, at least one $C_5$-$C_{16}$ cycloalkyl (meth)acrylate, at least one aryl methacrylate, (meth)acrylonitrile, at least one fluorine-containing acrylic monomer, at least one vinyl alkanoate, at least one vinyloxyalkane, at least one substituted or unsubstituted styrene, vinyl toluene, vinyl chloride, vinylidene chloride, 1-butene, or combinations thereof.
50. The method of embodiment 49, wherein said at least one vinyl alkanoate is selected from the group consisting of vinyl acetate, vinyl propionate, vinyl butyrate, vinyl valerate, and combinations thereof, wherein said at least one vinyloxyalkane is selected from the group consisting of vinyl ethyl ether, propyl vinyl ether, n-butyl vinyl ether, isoputyl vinyl ether, cyclohexyl vinyl ether, t-butyl vinyl ether, and combinations thereof, wherein said at least one fluorine-containing acrylic monomer is selected from the group consisting of 2,2,2-trifluoroethyl (meth)acrylate, tetrafluoropropyl (meth)acrylate, hexafluoro-isopropyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, perfluorohexylethyl-thiocarbonyl-aminoethyl-methacrylate, and combinations thereof.
51. The method of any one of embodiments 1 to 47, wherein said at least one polymerizable material comprises methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, or combinations thereof.
52. The method of any one of embodiments 1 to 47, wherein said at least one polymerizable material comprises methyl methacrylate, tert-butyl methacrylate, cyclohexyl methacrylate, isobornyl acrylate, isobornyl methacrylate, or combinations thereof.
53. The method of any one of embodiments 1 to 47, wherein said at least one polymerizable material comprises methyl methacrylate, tert-butyl methacrylate, cyclohexyl methacrylate, or combinations thereof.
54. The method of any one of embodiments 1 to 53, wherein said at least one polymerizable material comprises at least one UV-absorbing vinylic monomer and/or at least one UV/HEVL-Absorbing vinylic monomer.
55. The method of any one of embodiments 1 to 53, wherein said at least one polymerizable material comprises 2-[2'-hydroxy-5'-(2-methacryloxyethyl)phenyl)]-2H-benzotriazole (Norbloc).
56. The method of any one of embodiments 1 to 55, wherein the first polymerizable fluid composition comprses said at least one first thiolactone-containing vinylic monomer and the second polymerizable fluid composition comprises said at least one amino-containing compound.
57. The method of any one of embodiments 1 to 55, wherein the first polymerizable fluid composition comprses said at least one first amino-containing vinylic monomer and the second polymerizable fluid composition comprises said at least one thiolactone-containing compound.
58. The method of any one of embodiments 1 to 57, wherein said at least one thiolactone-containing compound is selected from the group consisting of 4-butyrothiolactone (or dihydro-2(3H)-thiophenone), 3-methyldihydro-2 (3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 5-methyltetrahydrothiophen-2-one, 5-ethyldihydro-2(3H)-thiophenone, 4-methyldihydrothiophen-2(3H)-one, 4,4-dimethyldihydro-2(3H)-thiophenone, 3,5-dimethyldihydro-2(3H)-thiophenone, 3,3-dimethyldihydro-2(3H)-thiophenone, 4,5-dimethyldihydro-2(3H)-thiophenone, 3-acetyldihydro-2(3H)-thiophenone, 4-carboxyldihydro-2(3H)-thiophenone (i.e., thioparaconic acid), N-acetyl homocysteine thiolactone, N-propionyl homocysteine thiolactone, N-butyryl homocysteine thiolactone, and N-carboxybutyryl homocysteine thiolactone (or 4-oxo-4-[(tetrahydro-2-oxo-3-thienyl)amino]-butanoic acid), erdosteine (i.e., {2-oxo-2-[(2-oxotetrahydro-3-thienyl)amino] ethyl}sulfanyl)-acetic acid), at least one second thiolactone-containing vinylic monomer having a thiolactone group, and combinations thereof, wherein said at least one first thiolactone-containing vinylic monomer and said at least one second thiolactone-containing vinylic monomer independent of one another are a reaction product of a second thiolactone-containing compound having a first reactive functional group and a vinylic monomer having a second reactive functional group, wherein the first reactive functional group is primary amino (—NH$_2$), isocyanato (—NCO), or carboxyl (—COOH) group, wherein the second reactive functional group is a carboxyl, acid chloride, acid anhydride, primary amino, isocyanato, hydroxyl, or epoxide group, wherein the first reactive functional group reacts with the second reactive functional group under coupling reaction conditions to form a covalent linkage of —CONH—, —OCONH—, —NHCONH—, —CH$_2$CH(OH)CH$_2$NH—, —NHCO—, or —CH$_2$CH(OH)CH$_2$CO—, wherein said at least one amino-containing compound is selected from the group consisting of C$_3$-C$_{10}$ alkylamines, C$_5$-C$_1$ cycloalkylamines, amino acids, aminoalcohols, at least one second amino-containing vinylic monomer having a primary amino group, and combinations thereof, wherein said at least one first amino-containing vinylic monomer and said at least one second amino-containing vinylic monomer independent of one another are selected from the group consisting of N-2-aminoethyl (meth)acrylamide, N-3-aminopropyl (meth)acrylamide, N-4-aminobutyl (meth)acrylamide, N-3-amino-3-methylbutyl (meth)acrylamide, N-5-aminopentyl (meth)acrylamide, N-6-aminohexyl (meth)acrylamide, 2-aminoethyl (meth)acrylate, 3-aminopropyl (meth)acrylate, 3-amino-2-hydroxypropyl (meth)acrylate, 4-aminobutyl (meth)acrylate, 5-aminopentyl (meth)acrylate, 6-aminohexyl (meth)acrylate, and combinations thereof.

59. The method of embodiment 58, wherein said at least one amino-containing compound is selected from the group consisting of propylamine, isopropylamine, butylamine, sec-butylamine, isobutylamine, tert-butylamine, tert-butylamine, tert-amylamine, amylamine, isopentylamine, 1,2-dimethylpropylamine, 2,2-dimethyl-1-propanamine, hexylamine, heptylamine, 2-ethyl-1-hexylamine, 1-propylbutylamine, cyclopentylamine, cyclopentyl-methanamine, cyclohexylamine, cyclohexanemethylamine, 1-cyclohexylethylamine, 2-cyclohexylethylamine, 1-amino-1-methylcyclohexane, 2-methylcyclohexylamine, 4-methylcyclohexylamine, glycine, alanine, valine, isoleucine, leucine, 2-aminoisobutyric acid, 4-aminobutyric acid, 3-aminoisobutyyric acid, 3-amino-butyric acid, β-alanine, 1-amino-3-cyclopentane carboxylic acid, 3-aminocyclohexanecarboxylic acid, 1-aminoethanol, 2-aminoethanol, 3-amino-1-propanol, 1-amino-2-propanol, 4-amino-1-butanol, 2-amino-1-butanol, 2-amino-3-methyl-1-butanol, 4-Amino-2-methyl-1-butanol, 5-amino-1-pentanol, 3-amino-2-pentanol, 6-amino-2-hydroxymethyl-1-hexanol, 4-amino-1-piperazineethanol, and combinations thereof, wherein the vinylic monomer having a second reactive functional group is selected from the group consisting of N-2-aminoethyl (meth)acrylamide, N-3-aminopropyl (meth)acrylamide, N-4-aminobutyl (meth)acrylamide, N-3-amino-3-methylbutyl (meth)acrylamide, N-5-aminopentyl (meth)acrylamide, N-6-aminohexyl (meth)acrylamide, 2-aminoethyl (meth)acrylate, 3-aminopropyl (meth)acrylate, 3-amino-2-hydroxypropyl (meth)acrylate, 4-aminobutyl (meth)acrylate, 5-aminopentyl (meth)acrylate, 6-aminohexyl (meth)acrylate, (meth)acrylic acid, (meth)acrylic acid chloride, ethylacrylic acid, propylacrylic acid, 2-(meth)acrylamidoglycolic acid, 2-(meth)acrylamidoacetic acid, 3-(meth)acrylamido-propionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 2-(meth)acryloxyacetic acid, 3-(meth)acryloxypropionic acid, 5-(meth)acryloxypentanoic acid, 4-(meth)acryloxybutanoic acid, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, trimethylammonium 2-hydroxy propyl (meth)acrylate hydrochloride, N-2-hydroxylethyl (meth)acrylamide, N-3-hydroxypropyl (meth)acrylamide, N-2-hydroxypropyl (meth)acrylamide, N-4-hydroxybutyl (meth)acrylamide, N-2-hydroxyethyl vinyl carbamate, 2-isocyanatoethyl (meth)acrylate, 2-(2-(meth)acryloyloxyethyloxy)ethyl Isocyanate, 2-[2-(2-(meth)acryloyloxyethyloxy)ethoxy]-ethyl Isocyanate, 3-isocyanatopropyl (meth)acrylate, glycidyl (meth)acrylate, (2-methyloxiranyl)methyl (meth)acrylate, and (meth)acrylic acid 2-(glycidyloxy)ethyl ester, wherein the thiolactone-containing compound is homocysteine thiolactone, N-carboxybutyryl homocysteine thiolactone, erdosteine, 4-carboxyldihydro-2(3H)-thiophenone, or thiolactone isocyanate.

60. The method of embodiment 58 or 59, wherein said at least one first and second thiolactone-containning vinylic monomers independent of one another are selected from the group consisting of N-(meth)acryloylhomocysteine thiolactone, N-[(meth)acryloxy-C$_2$-C$_6$ alkoxycarbonyl]-homocysteine thiolactone, N-[(meth)acrylamido-C$_2$-C$_6$ alkoxycarbonyl]-homocysteine thiolactone, N-[(meth)acryloxy-C$_2$-C$_6$ alkanoyl]homocysteine thiolactone, N-[(meth)acrylamido-C$_2$-C$_6$ alkanoyl]homocysteine thiolactone, N-[4-(meth)acryloxymethylcyclohexyl] methoxy-carbonyl-homocysteine thilactone, 5-[(meth) acryloxyethyl)]dihydro-2(3H)-thiophenone, 4-[(meth) acryloxy-C$_2$-C$_6$-alkylaminocarbonyl]dihydro-2(3H)-thiophenone, 4-[(meth)acrylamido-C$_2$-C$_6$-alkylaminocarbonyl]dihydro-2(3H)-thiophenone, N-(allyloxy)

carbonylhomocysteine thiolactone, α-(N-(4-vinylbenzenesulfonyl)homocysteine-γ-thiolactone, and combinations thereof.
61. The method of any one of embodiments 1 to 60, wherein step of curing is performed actinically with a UV or visible light.
62. The method of any one of embodiments 1 to 60, wherein step of curing is performed actinically with a visible light in a region of from 420 nm to 500 nm, wherein said at least one first free radical initiator comprises a benzoylphosphine initiator and/or an acylgermanium photoinitiator.
63. The method of any one of embodiments 1 to 60, wherein said at least one free radical initiator comprises a thermal polymerization initiator, wherein the step of curing is carried out thermally in an oven at one or more curing temperatures of from about 45° C. to about 100° C. under a nitrogen environment for at least 45 minutes to form an unprocessed silicone hydrogel lens contact lens, wherein the nitrogen environment in the oven is maintained by flowing nitrogen gas through the oven at a first flow rate.
64. The method of embodiment 63, wherein the polymerizable composition in the lens mold in the oven is cured for at least about 60 minutes.
65. The method of embodiment 63, wherein the polymerizable composition in the lens mold in the oven is cured for at least about 90 minutes.
66. The method of embodiment 63, wherein the polymerizable composition in the lens mold in the oven is cured for at least about 120 minutes.
67. The method of any one of embodiments 1 to 66, wherein said at least one photochromic vinylic monomer are selected from the group consisting of polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro(benzindoline)naphthoxazines, polymerizable spiro(indoline)-benzoxazines, polymerizable diarylethenes, and combinations thereof.
68. The method of any one of embodiments 1 to 67, wherein the second polymerizable fluid composition further comprises at least one third hydrophilic vinylic monomer.
69. The method of embodiment 68, wherein said at least one third hydrophilic vinylic monomer comprises at least one hydrophilic (meth)acrylamido monomer.
70. The method of embodiment 69, wherein said at least one hydrophilic (meth)acrylamido monomer having 3 to 8 carbon atoms relative to the total weight of the polymerizable composition.
71. The method of embodiment 69, wherein said at least one hydrophilic (meth)acrylamido monomer is selected from the group consisting of (meth)acrylamide, N-methyl (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis(2-hydroxyethyl) (meth)acrylamide, N-tris(hydroxymethyl) methyl (meth)acrylamide, 2-(meth)acrylamidoglycolic acid, 3-(meth)acrylamidopropionic acid, 4-(meth)acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 5-(meth)acrylamidopentanoic acid, 3-(meth)acrylamidohaxanoic acid, 4-(meth)acrylamido-3,3-dimethylhexanoic acid, (3-(meth)acrylamidophenyl)boronic acid, 3-((3-methacrylamidopropyl)dimethylammonio)-propane-1-sulfonate; 3-((3-acrylamidopropyl)dimethylammonio) propane-1-sulfonate, N-2-methylaminoethyl (meth)acrylamide, N-2-ethylaminoethyl (meth)acrylamide, N-2-dimethylaminoethyl (meth)acrylamide, N-3-methylaminopropyl (meth)acrylamide, N-3-dimethylaminopropyl (meth)acrylamide, poly(ethylene glycol)ethyl (meth)acrylamide having a number average molecular weight of up to 700, methoxy-poly(ethylene glycol)ethyl (meth)acrylamide having a number average molecular weight of up to 700, and combinations thereof.
72. The method of any one of embodiments 69 to 71, wherein said at least one hydrophilic (meth)acrylamido monomer comprises N,N-dimethyl (meth)acrylamide, N-ethyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, (meth)acrylamide, or combinations thereof.
73. The method of any one of embodiments 69 to 71, wherein said at least one hydrophilic (meth)acrylamido monomer comprises N,N-dimethyl (meth)acrylamide, N-2-hydroxyethyl (meth)acrylamide, or a combination thereof.
74. The method of any one of embodiments 68 to 73, wherein said at least one third hydrophilic vinylic monomer comprises at least one hydrophilic (meth)acryloxy monomer.
75. The method of embodiment 74, wherein said at least one second hydrophilic (meth)acryloxy monomer is selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, (meth)acrylic acid, ethylacrylic acid, propylacrylic acid, butylacrylic acid, 2-methylaminoethyl (meth)acrylate, 2-ethylaminoethyl (meth)acrylate, 3-methylaminopropyl (meth)acrylate, 3-ethylaminopropyl (meth)acrylate, trimethylammonium 2-hydroxy propyl (meth)acrylate hydrochloride, dimethylaminoethyl (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, and combinations thereof.
76. The method of any one of embodiments 68 to 75, wherein said at least one second hydrophilic vinylic monomer comprises at least one hydrophilic N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2- pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

77. The method of any one of embodiments 68 to 75, wherein said at least one second hydrophilic vinylic monomer comprises N-vinylpyrrolidone and/or N-vinyl-N-methyl acetamide.

78. The method of any one of embodiments 68 to 77, wherein said at least one second hydrophilic vinylic monomer comprises: (a) at least one methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (b) at least one vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (c) at least one allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (d) at least one phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio) ethylphosphate, 4-[(meth)acryloylamino]butyl-2'-(trimethylammonio)-ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)-ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)-pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)-ethylphosphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (e) allyl alcohol; (f) N-2-hydroxyethyl vinyl carbamate; (g) N-vinyloxycarbonyl-β-alanine (VINAL); (h) N-vinyloxycarbonyl-α-alanine; or (i) combinations thereof.

79. The method of any one of embodiments 1 to 78, wherein the second polymerizable fluid composition further comprises at least one polymeric non-reactive diluent, wherein said at least one polymeric non-reactive diluent is a poly($C_2$-$C_4$ alkyleneoxide) polymer and is present in an amount sufficient to dissolve said at least photochromic vinylic monomer.

80. The method of embodiment 79, wherein the poly($C_2$-$C_4$ alkyleneoxide) polymer is represented by formula of $T_1$-$(EO)_{e2}(PO)_{p2}(BO)_b 2$-$T_2$ in which: $T_1$ and $T_2$ independent of each other is hydrogen or a $C_1$-$C_4$ alkyl; EO is a divalent radical of ethyleneoxide ($-CH_2-CH_2-O-$); PO is a divalent radical of propyleneoxide

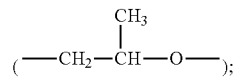

BO is a divalent radical of butyleneoxide

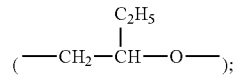

e2 is zero or an integer of from 5 to 65; p2 is zero or an integer of from 5 to 52; b2 is zero or integer of from 5 to 30; wherein if p2 is not zero, b2 is zero; wherein if b2 is not zero, p2 is zero and e2 is not zero; wherein (e2+p2+b2) is a value to provide the poly($C_2$-$C_4$ alkyleneoxide) polymer with a number average molecular weight of from about 300 to about 3000 Daltons.

81. The method of embodiment 80, wherein $T_1$ and $T_2$ independent of each other is hydrogen or methyl.

82. The method of any one of embodiment 79 to 81, wherein the poly($C_2$-$C_4$ alkyleneoxide) polymer has a number average molecular weight of from about 400 to about 2500 Daltons.

83. The method of any one of embodiment 79 to 81, wherein the poly($C_2$-$C_4$ alkyleneoxide) polymer has a number average molecular weight of from about 400 to about 2000 Daltons.

84. The method of any one of embodiment 79 to 81, wherein the poly($C_2$-$C_4$ alkyleneoxide) polymer has a number average molecular weight of from about 400 to about 1500 Daltons.

85. The method of any one of embodiments 79 to 84, wherein the poly($C_2$-$C_4$ alkyleneoxide) polymer is poly(ethyleneoxide) ("PEO"), poly(propyleneoxide) ("PPO"), poly(ethyleneoxide)-poly(propyleneoxide) di-block copolymer ("PEO-PPO"), poly(ethyleneoxide)-poly(propyleneoxide)-poly(ethyleneoxide) tri-block copolymer ("PEO—PPO-PEO"), poly(propyleneoxide)-poly(ethyleneoxide)-poly(propyleneoxide) tri-block copolymer ("PPO-PEO-PPO"), poly(ethyleneoxide)-poly(butyleneoxide) di-block copolymer ("PEO-PBO"), poly(ethyleneoxide)-poly(butyleneoxide)-poly(ethyleneoxide) tri-block copolymer ("PEO—PBO-PEO"), poly(butyleneoxide)-poly(ethyleneoxide)-poly(butyleneoxide) tri-block copolymer ("PBO-PEO-PBO"), or a mixture thereof.

86. The method of any one of embodiments 79 to 84, wherein the poly($C_2$-$C_4$ alkyleneoxide) polymer is poly(propyleneoxide) ("PPO").

87. The method of any one of embodiments 79 to 84, wherein the poly($C_2$-$C_4$ alkyleneoxide) polymer is poly(ethyleneoxide)-poly(butyleneoxide) di-block copolymer ("PEO-PBO"), poly(ethyleneoxide)-poly(butyleneoxide)-poly(ethyleneoxide) tri-block copolymer ("PEO—PBO-PEO"), poly(butyleneoxide)-poly(ethyleneoxide)-poly(butyleneoxide) tri-block copolymer ("PBO-PEO-PBO"), or a mixture thereof.

88. The method of any one of embodiments 79 to 84, wherein the poly($C_2$-$C_4$ alkyleneoxide) polymer is poly(ethyleneoxide)-poly(propyleneoxide) di-block copolymer ("PEO-PPO"), poly(ethyleneoxide)-poly(propyleneoxide)-poly(ethyleneoxide) tri-block copolymer ("PEO—PPO-PEO"), poly(propyleneoxide)-poly(ethyleneoxide)-poly(propyleneoxide) tri-block copolymer ("PPO-PEO-PPO"), or a mixture thereof.

89. The method of any one of embodiments 79 to 84, wherein the poly($C_2$-$C_4$ alkyleneoxide) polymer is poly(ethyleneoxide).

90. The method of any one of embodiments 1 to 89, wherein the step of initiating thiol-induced polymerization is carried out thermally.

91. The method of any one of embodiments 1 to 89, wherein the step of initiating thiol-induced polymerization is carried out actinically with UV/Visible light irradiation.

92. The method of any one of embodiments 1 to 89, wherein the step of initiating thiol-induced polymerization is carried out actinically with a spatial limitation of UV/Visible radiation.

93. The method of embodiment 92, wherein the spatial limitation of UV/visible radiation is obtained by using a mask or screen having a UV/visible-radiation-permeable region, a UV/Visible-radiation-impermeable region surrounding the UV/Visible-radiation-permeable region, and a projection contour which is the boundary between the UV/visible-radiation-impermeable and UV/visible-radiation-permeable regions, wherein the mask or screen allows to spatially projects a beam of UV/visible radiation having a circular cross-sectional profile with a diameter of about 13 mm or smaller defined by the projection contour of the mask or screen.

94. The method of any one of embodiments 1 to 93, further comprising a step of subjecting the unprocessed photochromic contact lens obtained in step (6) to one or more post-molding processes selected from the group consisting of extraction, hydration, surface treatment, packaging, sterilization, and combinations thereof.

95. A photochromic contact lens obtained according to the method of any one of embodiments 1 to 94.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH ~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. Transmittance is calculated using the following equations:

UVA % $T$=Average % Transmission between 315 nm and 380 nm×100

UVB % *T*=Average % Transmission between 280 nm and 315 nm×100

Violet % *T*=Average % Transmission between 380 nm and 440 nm×100.

All the publications and patents which have been cited herein above are hereby incorporated by reference in their entireties.

What is claimed is:

1. A method for producing photochromic contact lenses, comprising the steps of:
    (1) obtaining a first polymerizable fluid composition, wherein the first polymerizable fluid composition comprises (i) at least one polymerizable material, (ii) at least one first free-radical initiator, and (iii) at least one first thiolactone-containing vinylic monomer having a thiolactone group or at least one first amino-containing vinylic monomer having a primary amino group;
    (2) introducing the first polymerizable fluid composition into a lens mold, wherein the lens mold comprises a male mold half having a first molding surface and a female mold half having a second molding surface, wherein the male and female mold halves are configured to receive each other such that a mold cavity is formed between the first and second molding surfaces and the first polymerizable fluid composition is enclosed in the mold cavity when the mold is closed;
    (3) curing thermally or actinically the first polymerizable fluid composition in the mold cavity of the lens mold to form an unprocessed contact lens having a crosslinked polymer network with pendant thiolactone groups or pendant primary amino groups;
    (4) separating the lens mold into the male and female mold halves, with the unprocessed contact lens adhered onto a lens-adhered mold half which is one of the male and female mold halves;
    (5) dispensing a specific amount of of a second polymerizable fluid composition in a central circular region on the surface of the unprocessed contact lens adhered on the lens-adhered mold half, wherein the second polymerizable fluid composition comprises (i) at least one photochromic vinylic monomer, (ii) at least one amino-containing compound having a primary amino group or at least one thiolactone-containing compound having a thiolactone group, and (iii) at least one second free-radical initiator, wherein if the first polymerizable fluid composition comprses said at least one first thiolactone-containing vinylic monomer, the second polymerizable fluid composition comprises said at least one amino-containing compound, wherein if the first polymerizable fluid composition comprses said at least one first amino-containing vinylic monomer, the second polymerizable fluid composition comprises said at least one thiolactone-containing compound;
    (6) allowing the second polymerizable fluid composition penetrating and diffusing into the crosslinked polymer network located in a central circular zone, thereby forming pendant thiol groups each of which is formed between one of the pendant thiolactone groups located in the central circular zone and one primary amino group of said at least one amino-containing compound or between one of the pendant primary groups located in the central circular zone and one thiolactone group of said at least one thiolactone-containing compound; and
    (7) after the second polymerizable fluid composition has penetrated and diffused into the crosslinked polymer network, initiating thiol-induced polymerization of the second polymerizable composition to graft said at least one photochromic vinylic monomer onto the crosslinked polymer network, thereby obtaining an unprocessed photochromic contact lens having a central photochromic zone that has a diameter of about 13 mm or less and is concentric with the central axis of the unprocessed photochromic contact lens and capable of undergoing reversible change from a colorless or light-colored state to a colored state upon exposure to UV/HEVL radiation.

2. The method of claim 1, wherein said at least one photochromic vinylic monomer are selected from the group consisting of polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans;

polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline) pyridobenzoxazines, polymerizable spiro(benzindoline)pyridobenzoxazines, polymerizable spiro (benzindoline)naphthoxazines, polymerizable spiro (indoline)-benzoxazines, polymerizable diarylethenes, and combinations thereof.

3. The method of claim 2, wherein said at least one thiolactone-containing compound is selected from the group consisting of 4-butyrothiolactone, 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 5-methyltetrahydrothiophen-2-one, 5-ethyldihydro-2(3H)-thiophenone, 4-methyldihydrothiophen-2(3H)-one, 4,4-dimethyldihydro-2(3H)-thiophenone, 3,5-dimethyldihydro-2(3H)-thiophenone, 3,3-dimethyldihydro-2(3H)-thiophenone, 4,5-dimethyldihydro-2(3H)-thiophenone, 3-acetyldihydro-2(3H)-thiophenone, 4-carboxyldihydro-2(3H)-thiophenone, N-acetyl homocysteine thiolactone, N-propionyl homocysteine thiolactone, N-butyryl homocysteine thiolactone, and N-carboxybutyryl homocysteine thiolactone, erdosteine, at least one second thiolactone-containing vinylic monomer having a thiolactone group, and combinations thereof, wherein said at least one thiolactone-containing vinylic monomer and said at least one second thiolactone-containing vinylic monomer independent of one another are a reaction product of a second thiolactone-containing compound having a first reactive functional group and a vinylic monomer having a second reactive functional group, wherein the first reactive functional group is -NH$_2$, —NCO, or —COOH, wherein the second reactive functional group is —COOH, —COCl, an acid anhydride group, —NH2, —NCO, —OH, or an epoxide group, wherein the first reactive functional group reacts with the second reactive functional group under coupling reaction conditions to form a covalent linkage of —CONH—, —OCONH—, —NHCONH—, —CH$_2$CH(OH)CH$_2$NH—, —NHCO—, or —CH$_2$CH (OH)CH$_2$CO—, wherein said at least one amino-containing compound is selected from the group consisting of C$_3$-C$_{10}$ alkylamines, C$_5$-C$_{10}$ cycloalkylamines, amino acids, aminoalcohols, at least one second amino-containing vinylic monomer having a primary amino group, and combinations thereof,
wherein said at least one first amino-containing vinylic monomer and said at least one second amino-containing vinylic monomer indpendent of one another are selected from the group consisting of N-2-aminoethyl (meth)acrylamide, N-3-aminopropyl (meth)acrylamide, N-4-aminobutyl (meth)acrylamide, N-3-amino-3-methylbutyl (meth)acrylamide, N-5-aminopentyl (meth)acrylamide, N-6-aminohexyl (meth)acrylamide, 2-aminoethyl (meth)acrylate, 3-aminopropyl (meth) acrylate, 3-amino-2-hydroxypropyl (meth)acrylate, 4-aminobutyl (meth)acrylate, 5-aminopentyl (meth) acrylate, 6-aminohexyl (meth)acrylate, and combinations thereof.

4. The method of claim 3, wherein the first polymerizable fluid composition comprses said at least one first thiolactone-containing vinylic monomer and the second polymerizable fluid composition comprises said at least one amino-containing compound.

5. The method of claim 4, wherein step of curing is performed actinically with a UV or visible light.

6. The method of claim 5, wherein the step of initiating thiol-induced polymerization is carried out thermally.

7. The method of claim 5, wherein the step of initiating thiol-induced polymerization is carried out actinically with UV/Visible light irradiation.

8. The method of claim 5, wherein the step of initiating thiol-induced polymerization is carried out actinically with a spatial limitation of UV/Visible radiation.

9. The method of claim 3, wherein the first polymerizable fluid composition comprses said at least one first amino-containing vinylic monomer and the second polymerizable fluid composition comprises said at least one thiolactone-containing compound.

10. The method of claim 9, wherein step of curing is performed actinically with a UV or visible light.

11. The method of claim 10, wherein the step of initiating thiol-induced polymerization is carried out thermally.

12. The method of claim 10, wherein the step of initiating thiol-induced polymerization is carried out actinically with UV/Visible light irradiation.

13. The method of claim 10, wherein the step of initiating thiol-induced polymerization is carried out actinically with a spatial limitation of UV/Visible radiation.

14. The method of claim 4, wherein said at least one free radical initiator comprises a thermal polymerization initiator, wherein the step of curing is carried out thermmally in an oven at one or more curing temperatures of from about 45° C. to about 100° C. under a nitrogen environment for at least 45 minutes to form an unprocessed silicone hydrogel lens contact lens, wherein the nitrogen environment in the oven is maintained by flowing nitrogen gas through the oven at a first flow rate.

15. The method of claim 14, wherein the step of initiating thiol-induced polymerization is carried out thermally.

16. The method of claim 14, wherein the step of initiating thiol-induced polymerization is carried out actinically with UV/Visible light irradiation.

17. The method of claim 14, wherein the step of initiating thiol-induced polymerization is carried out actinically with a spatial limitation of UV/Visible radiation.

18. The method of claim 10, wherein said at least one free radical initiator comprises a thermal polymerization initiator, wherein the step of curing is carried out thermally in an oven at one or more curing temperatures of from about 45° C. to about 100° C. under a nitrogen environment for at least 45 minutes to form an unprocessed silicone hydrogel lens contact lens, wherein the nitrogen environment in the oven is maintained by flowing nitrogen gas through the oven at a first flow rate.

19. The method of claim 18, wherein the step of initiating thiol-induced polymerization is carried out thermally.

20. The method of claim 18, wherein the step of initiating thiol-induced polymerization is carried out actinically with UV/Visible light irradiation.

21. The method of claim 18, wherein the step of initiating thiol-induced polymerization is carried out actinically with a spatial limitation of UV/Visible radiation.

* * * * *